US012516698B2

(12) United States Patent
Neishi et al.

(10) Patent No.: US 12,516,698 B2
(45) **Date of Patent: *Jan. 6, 2026**

(54) CARBURIZED BEARING

(71) Applicants: NIPPON STEEL CORPORATION, Tokyo (JP); JTEKT CORPORATION, Aichi (JP)

(72) Inventors: Yutaka Neishi, Tokyo (JP); Keisuke Chiba, Tokyo (JP); Kohei Kanetani, Nara (JP); Takashi Sada, Osaka (JP)

(73) Assignees: NIPPON STEEL CORPORATION, Tokyo (JP); JTEKT CORPORATION, Aichi (JP)

( * ) Notice: Subject to any disclaimer, the term of this patent is extended or adjusted under 35 U.S.C. 154(b) by 479 days.

This patent is subject to a terminal disclaimer.

(21) Appl. No.: 17/905,886

(22) PCT Filed: Mar. 31, 2021

(86) PCT No.: PCT/JP2021/013991

§ 371 (c)(1),
(2) Date: Sep. 8, 2022

(87) PCT Pub. No.: WO2021/201157

PCT Pub. Date: Oct. 7, 2021

(65) Prior Publication Data

US 2023/0151853 A1 May 18, 2023

(30) Foreign Application Priority Data

Mar. 31, 2020 (JP) ................................ 2020-063055

(51) Int. Cl.

| | |
|---|---|
| ***C22C 38/02*** | (2006.01) |
| ***C22C 38/04*** | (2006.01) |
| ***C22C 38/06*** | (2006.01) |
| ***C22C 38/22*** | (2006.01) |
| ***C22C 38/24*** | (2006.01) |
| ***C23C 8/22*** | (2006.01) |
| ***F16C 33/62*** | (2006.01) |

(52) U.S. Cl.

CPC ............. *F16C 33/62* (2013.01); *C22C 38/02* (2013.01); *C22C 38/04* (2013.01); *C22C 38/06* (2013.01); *C22C 38/22* (2013.01); *C22C 38/24* (2013.01); *C23C 8/22* (2013.01); *F16C 2202/04* (2013.01); *F16C 2204/64* (2013.01); *F16C 2204/70* (2013.01)

(58) Field of Classification Search

CPC ... C21D 1/06; C21D 1/18; C21D 1/26; C21D 1/76; C21D 2211/002; C21D 2211/008; C21D 8/065; C21D 9/0075; C21D 9/40; C22C 38/02; C22C 38/04; C22C 38/06; C22C 38/20; C22C 38/22; C22C 38/24; C22C 38/26; C22C 38/28; C22C 38/32; C22C 38/44; C22C 38/46; C23C 8/02; C23C 8/22; C23C 8/80

See application file for complete search history.

(56) References Cited

U.S. PATENT DOCUMENTS

| | | | | |
|---|---|---|---|---|
| 5,660,647 | A | 8/1997 | Mitamura et al. | |
| 11,168,387 | B2 * | 11/2021 | Yamashita | C23C 8/34 |
| 11,965,231 | B2 * | 4/2024 | Neishi | C23C 8/32 |
| 2004/0094238 | A1 | 5/2004 | Kinami et al. | |
| 2005/0257860 | A1 | 11/2005 | Takayama | |
| 2020/0208246 | A1 | 7/2020 | Yamashita et al. | |
| 2022/0042545 | A1 * | 2/2022 | Neishi | C21D 1/76 |
| 2023/0118113 | A1 * | 4/2023 | Neishi | C22C 38/24 420/91 |

FOREIGN PATENT DOCUMENTS

| | | | |
|---|---|---|---|
| JP | 08049057 | A | 2/1996 |
| JP | 2008280583 | A | 11/2008 |
| WO | 2019039610 | A1 | 2/2019 |

OTHER PUBLICATIONS

NPL: on-line translation of WO-2019039610 A1, Feb. 2019 (Year: 2019).*

* cited by examiner

*Primary Examiner* — Jie Yang

(74) *Attorney, Agent, or Firm* — Greer, Burns & Crain, Ltd.

(57) ABSTRACT

There is provided a carburized bearing that is excellent in rolling contact fatigue life with a change in structure under a hydrogen-generating environment. In the carburized bearing, a chemical composition of a core portion consists of, in mass %, C: 0.25 to 0.45%, Si: 0.10 to 0.50 %, Mn: 0.40 to 0.70 %, P: 0.015% or less, S: 0.005% or less, Cr: 0.80 to 1.50%, Mo: 0.17 to 0.30%, V: 0.24 to 0.40%. Al: 0.005 to 0.100%, N: 0.0300% or less, O: 0.0015% or less, and the balance being Fe and impurities, and satisfies Formula (1) to Formula (4) described in the present specification. A proportion of a total area of CaO—CaS—MgO—$Al_2O_3$ composite oxides with respect to a total area of oxides in the carburized leaping is 30.0% or more, and a number density of oxides having an equivalent circle diameter of 20.0 μm or more is 15.0 pieces/$mm^2$ or less.

2 Claims, No Drawings

CARBURIZED BEARING

TECHNICAL FIELD

The present disclosure relates to a bearing, and more specifically to a carburized bearing, which is a bearing subjected to carburizing.

BACKGROUND ART

Bearing steels are typified by SUJ2 specified in JIS G 4805(2008). The bearing steels are produced into a bearing by the following method. Hot forging and/or cutting machining is performed on a steel to produce an intermediate product having a desired shape. Heat treatment is performed on the intermediate product to adjust a hardness of the steel and formulate a microstructure of the steel. Examples of the heat treatment include quenching and tempering, carburizing, and carbonitriding treatment. Through the above processes, a bearing having desired bearing, performances (wear resistance and a toughness of a core portion of the bearing) is produced.

In a case where improvement of wear resistance and improvement of toughness are particularly required as bearing performance, carburizing is performed as the aforementioned heat treatment. Carburizing herein means a treatment in which carburizing-quenching and tempering are performed. In carburizing, a carburized layer is formed in an outer layer of a steel, which hardens the outer layer of the steel. As mentioned above, a bearing subjected to carburizing will be herein referred to as a carburized bearing.

Techniques for increasing a wear resistance, toughness, and the like of a bearing are proposed in Japanese Patent Application Publication No. 8-49057 (Patent Literature 1), and Japanese Patent Application Publication No. 2008-280583 (Patent Literature 2).

A rolling bearing disclosed in Patent Literature 1 includes a race and a rolling element a starting material of at least one of which is a steel containing C: 0.1 to 0.7% by weight, Cr: 0.5 to 3.0% by weight, Mn: 0.3 to 1.2% by weight, Si: 0.3 to by weight, and Mo: 3% by weight or less, and further containing V: 0.8 to 2.0% by weight. An intermediate product formed from the starting material is subjected to carburizing, and a concentration of carbon in a surface of the bearing is made 0.8 to 1.5% by weight and a concentration ratio V/C of the surface of the bearing is made 1 to 2.5. Patent Literature 1 describes that a wear resistance of the rolling bearing can be increased because V carbides are formed on a surface of the rolling bearing.

A case hardening steel disclosed in Patent Literature 2 has a composition consisting of, in mass %, C: 0.1 to 0.4%, Si: 0.5% or less, Mn: 1.5% or less, P: 0.03% or less, S: 0.03% or less, Cr: 0.3 to 2.5%, Mo: 0.1 to 2.0%, V: 0.1 to 2.0%, Al: 0.050% or less, 0: 0.0015% or less. N: 0.025% or less, and V+Mo: 0.4 to 3.0%, with the balance being Fe and unavoidable impurities. The case hardening steel is a steel which is subjected to carburizing, in which an outer layer concentration of C after the carburizing is 0.6 to 1.2%, the surface hardness is HRC 58 or more to less than 64, and among V-based carbides in the outer layer, the numerical proportion of fine V-based carbides having a particle size of less than 100 nm is 80% or more.

CITATION LIST

Patent Literature

Patent Literature 1: Japanese Patent Application Publication. No. 8-49057

Patent Literature 2: Japanese Patent Application Publication No. 2008-280583

SUMMARY OF INVENTION

Technical Problem

Bearings are categorized into middle or large bearings used for mining machinery or construction machinery and small bearings used for automobiles. Examples of small bearings include bearings used in driving components such as a transmission. Small bearings for automobiles are often used in environments in which a lubricant circulates.

Recently, a viscosity of a lubricant is decreased to reduce frictional drag and transmission resistance, and a usage of lubricant to circulate is reduced, for improvement of fuel efficiency. Therefore, in an environment in which a bearing is used, the lubricant in use is liable to decompose to generate hydrogen, in a case where hydrogen is generated in an environment in which a bearing is used, hydrogen penetrates into the bearing from the outside. The penetrating hydrogen causes a change in structure partly in a microstructure of the bearing. The change in structure during use of the bearing, decreases a rolling contact fatigue life of the bearing. Hereinafter, an environment in which hydrogen causing a change in structure is generated will be referred to as "hydrogen-generating environment" in the present specification.

A bearing to be used in a hydrogen-generating environment is required to have an excellent rolling contact fatigue life. In addition, in a process of producing a carburized bearing, the bearing may be subjected to cutting machining for providing the final shape of the bearing. In this case, the steel to be a starting material of a carburized bearing is also required to have an excellent machinability.

Patent Literature 1 and Patent Literature 2 have no discussions about compatibly achieving both a rolling contact fatigue life under a hydrogen-generating environment as a carburized bearing and machinability as steel.

An objective of the present disclosure is to provide a carburized bearing that is excellent in rolling contact fatigue life under a hydrogen-generating environment.

Solution to Problem

A carburized bearing according to the present disclosure includes:

- a carburized layer formed in an outer layer of the carburized bearing; and
- a core portion inner than the carburized layer, wherein the core portion consists of, in mass %:
- C: 0.25 to 0.45%,
- Si: 0.10 to 0.50%.
- Mn: 0.40 to 0.70%,
- P: 0.015% or less,
- S: 0.005% or less,
- Cr: 0.80 to 1.50%,
- Mo: 0.17 to 0.30%,
- V: 0.24 to 0.40%,
- Al: 0.005 to 0.100%,
- N: 0.0300% or less,
- O: 0.0015% or less, and
- the balance being Fe and impurities, and
- on a precondition that a content of each element of the core portion falls within a range described above, Formula (1) to Formula (4) are satisfied, wherein a concentration of C of a surface of the carburized bearing is, in mass %, 0.70 to 1.20%.

a Rockwell hardness C scale HRC of the surface of the carburize bearing is 58.0 to 65.0, when composite inclusions containing CaO and/or CaS, MgO and $Al_2O_3$ are defined as CaO—CaS—MgO—$Al_2O_3$ composite oxides, a proportion of a total area of the CaO—CaS—MgO—$Al_2O_3$ composite oxides with respect to a total area of oxides in the carburized bearing is 30.0% or more, and among oxides in the carburized bearing, a number density of oxides having an equivalent circle diameter of 20.0 μm or more is 15.0 pieces/mm$^2$ or less:

$$1.50<0.4Cr+0.4Mo+4.5V<2.45 \quad (1)$$

$$2.20<2.7C+0.4Si+Mn+0.45Ni+0.8Cr+Mo+V<3.50 \quad (2)$$

$$Mo/V\geq 0.58 \quad (3)$$

$$(Mo+V+Cr)/(Mn+20P)\geq 2.00 \quad (4)$$

where each symbol of an element in Formula (1) to Formula (4) is to be substituted by a content of a corresponding element in mass %, and is to be substituted by "0" if the corresponding element is not contained.

Advantageous Effect of Invention

The carburized bearing according to the present disclosure is excellent in rolling contact fatigue life under a hydrogen-generating environment.

DESCRIPTION OF EMBODIMENTS

The present inventors conducted investigations and studies about a rolling contact fatigue life under a hydrogen-generating environment of the carburized bearing.

First, the present inventors conducted studies about a chemical composition of a core portion of a carburized bearing in order to obtain the property described above. As a result, the present inventors considered that when the chemical composition of a core portion is a chemical composition consisting of, in mass %, C: 0.25 to 0.45%, Si: 0.10 to 0.50%, Mn: 0.40 to 0.70%, P: 0.015% or less, S: 0.005% or less, Cr: 0.80 to 1.50%, Mo: 0.17 to 0.30%, V: 0.24 to 0.40%, Al: 0.005 to 0.100%, N: 0.0300% or less, 0: 0.0015% or less, Cu: 0 to 0.20%, to 0.20%, B: 0 to 0.0050%, Nb: 0 to 0.100%, to 0.100%, and the balance being Fe and impurities, there is a possibility of improving a rolling contact fatigue life under a hydrogen-generating environment.

It was however revealed that even a carburized bearing in which contents of elements of the chemical composition of its core portion fall within the respective ranges described above does not necessarily have the above-described property (the rolling contact fatigue life under a hydrogen-generating environment) improved. Hence, the present inventors conducted further studies. As a result, the present inventors found that, on the precondition that the contents of the elements in the chemical composition fall within the ranges described above, if the following Formula (1) to Formula (4) are satisfied, the rolling contact fatigue life under a hydrogen-generating environment can be increased.

$$1.50<0.4Cr+0.4Mo+4.5V<2.45 \quad (1)$$

$$2.20<2.7C+0.4Si+Mn+0.45Ni+0.8Cr+Mo+V<3.50 \quad (2)$$

$$Mo/V\geq 0.58 \quad (3)$$

$$(Mo+V+Cr)/(Mn+20P)\geq 2.00 \quad (4)$$

where each symbol of an element M Formula (1) to Formula (4) is to be substituted, by a content of a corresponding element (mass %), and is to be substituted by "0" if the corresponding element is not contained.

[Formula (1)]

To increase a rolling contact fatigue life of a carburized hearing under a hydrogen-generating environment, it is effective to produce V-based precipitates having equivalent circle diameters of 150 nm or less in a large quantity in the carburized bearing. Here, the term "V precipitates" is a concept that includes any one or more types among carbides containing V (V carbides), carbo-nitrides containing V (V carbo-nitrides), complex carbides containing V (complex V carbides), and complex carbo-nitrides containing V (complex V carbo-nitrides). The complex V carbides mean carbides containing V and Mo. The complex V carbo-nitrides mean carbo-nitrides containing V and Mo. In the present description, V precipitates having equivalent circle diameters of 150 nm or less will also be referred to as "small V precipitates".

Small V precipitates trap hydrogen. In addition, because of being small, small precipitates resist serving as an origin of a crack. Therefore, by dispersing small. V precipitates in a carburized bearing sufficiently, a change in structure is not to occur under a hydrogen-generating environment. As a result, a rolling contact fatigue life of the carburized bearing under the hydrogen-generating environment can be increased.

Let F1 be defined as F1=0.4Cr+0.4Mo+4.5V. F1 is an index relating to an amount of produced small V precipitates, which trap hydrogen to increase a rolling contact fatigue life of a carburized bearing under a hydrogen-generating environment, Production of small V precipitates is accelerated by containing V as well as Cr and Mo in the carburized bearing. Specifically, Cr produces Fe-based carbides such as cementite or Cr carbides in a temperature region lower than a temperature region in which V precipitates are produced, Mo produces Mo carbides ($Mo_2C$) in a temperature region lower than the temperature region in which V precipitates are produced. As the temperature rises, the Fe-based carbides, the Cr carbides, and the Mo carbides are dissolved to serve as nucleation sites of precipitation for the V precipitates.

If F1 is 1.50 or less, even when contents of elements in a chemical composition fall within the respective ranges according to the present embodiment and satisfy Formula (2) to Formula (4), the total content of a content of Cr, a content of Mo and a content of V in the steel will be insufficient. In a case where F1 is 1.50 or less as a result of the content of Cr and the content of Mo being small, nucleation sites of precipitation for V precipitates are insufficient. In a case where F1 is 1.50 or less as a result of the content of V being small, even if nucleation sites for V precipitates exist, V precipitates are not produced sufficiently.

On the other hand, if F1 is 2.45 or more, even when contents of elements fall within the respective ranges according to the present embodiment and satisfy Formula (2) to Formula (4), coarse V precipitates having equivalent circle diameters of more than 150 nm are produced. In the present description, V precipitates having equivalent cute diameters of more than 150 nm will also be referred to as "coarse V precipitates". Coarse V precipitates have a poor performance in trapping hydrogen. Therefore, when a resulting carburized bearing is used under a hydrogen-generating environment, coarse V precipitates are liable to cause a change in structure within the carburized bearing. Consequently, a rolling contact fatigue life of the carburized bearing under a hydrogen-generating environment decreases due to a charm in structure under the hydrogen-generating environment.

When F1 is more than 1.50 and less than 2.45, on the precondition that contents of the elements fall within the respective ranges according to the present embodiment and satisfy Formula (2) to Formula (4), small V precipitates are produced adequately in a resulting carburized bearing. Therefore, when the carburized bearing is used under a hydrogen-generating environment, a change in structure is not liable to occur within the carburized bearing. As a result, a rolling contact fatigue life of the carburized bearing under a hydrogen-generating environment is increased. In addition, when F1 is less than 2.45, the production of coarse V precipitates is prevented or reduced, and further, a large number of small V precipitates are also produced in the outer layer of the carburized bearing. Therefore, the wear resistance of the carburized bearing is also improved,

[Formula (2)]

Additionally, to increase a rolling contact fatigue life of a carburized bearing under a hydrogen-generating environment, it is effective to increase a strength of a core portion of the carburized bearing. To increase a strength of a core portion of a carburized bearing, it is effective to increase a hardenability of a steel to be a starting, material. However, if a hardenability of a steel for a carburized bearing is increased excessively, a machinability of the steel to be a starting material of a carburized bearing is decreased.

Let F2 be defined as F2=2.7C'0.4Si+Mn+0.45Ni+0.8Cr+Mo+V. Elements shown in F2 (C, Si, Mn, Ni, Cr, Mo, and V) are primary elements increasing a hardenability of a steel, out of the elements in the above-described chemical composition. Thus, F2 is an index of the strength of a core portion of a carburized bearing and a machinability of the steel to be the starting material of the carburized bearing.

If F2 is 2.20 or less, even when contents of elements fall within the respective ranges according; to the present embodiment and satisfy Formula (1), Formula (3) and Formula (4), a hardenability of a resulting steel is insufficient. Therefore, the strength of a core portion of a resulting carburized bearing is insufficient, and a sufficient rolling contact fatigue life of the carburized bearing under a hydrogen-generating environment is not obtained.

On the other hand, if F2 is 3.50 or more, even when contents of elements fall within the respective ranges according to the present embodiment and satisfy Formula (1), Formula (3), and Formula (4), the strength of a resulting steel to be a starting material of a carburized bearing is too high. In this case, a sufficient machinability is not obtained for a resulting steel to be a starting material of a carburized bearing.

When F2 is more than 2.20 and less than 3.50, on the precondition that contents of elements fall within the respective ranges according to the present embodiment and satisfy Formula (1), Formula (3), and Formula (4), a sufficient machinability is obtained for a resulting steel to be a starting material of the carburized bearing. In addition, the strength of a core portion of a resulting carburized bearing is sufficiently increased, and a rolling contact fatigue life of the carburized bearing under a hydrogen-generating environment is sufficiently increased.

[Formula (3)]

As described above, Mo is an element that accelerates precipitation of small V precipitates. Specifically, F1 satisfying Formula (1) allows provision of a total content of a content of V, a content of Cr, and a content of Mo necessary to produce small V precipitates. However, as a result of studies conducted by the present inventors, it was revealed that production of sufficient small V precipitates further requires adjustment of a proportion of a content of V to a content of Mn. Specifically, if the ratio (=Mo/V) of a content of Mo to a content of V is excessively Mo carbides to serve as nucleation sites of precipitation for small V precipitates do not precipitate sufficiently. In this case, small V precipitates are not produced sufficiently.

Let F3 be defined as F3=Mo/V. If F3 is less than 0.58, even when the contents of the elements fall within the respective ranges according to the present embodiment and satisfy Formula (1), Formula (2), and Formula (4), small V precipitates are not produced sufficiently in a resulting carburized bearing. As a result, a sufficient rolling contact fatigue life of the carburized bearing under a hydrogen-generating environment is not obtained.

On the precondition that contents of elements fall within the respective ranges according to the present embodiment and satisfy Formula (1), Formula (2), and Formula (4), when F3 is 0.58 or more, that is, Formula (3) is satisfied, small V precipitates are sufficiently produced in a resulting carburized bearing. As a result, a rolling contact fatigue life of the carburized bearing under a hydrogen-generating environment is sufficiently increased.

[Formula (4)]

The above-described small V precipitates not only trap hydrogen but also exert precipitation strengthening to strengthen insides of grains. In this connection, if grain boundaries in a carburized bearing under a hydrogen-generating environment can be strengthened, and in addition, penetration of hydrogen to the carburized bearing can, in the first place, be prevented or reduced, a rolling contact fatigue life of the carburized bearing under the hydrogen-generating environment can be further increased by a synergetic effect of three effects: (a) intragranular strengthening by small V precipitates, (b) grain-boundary strengthening, and (c) hydrogen penetration prevention.

The intragranular strengthening indicated as (a) depends on a total content of a content of Mo, a content of V, and a content of Cr, as described above. Meanwhile, for the grain-boundary strengthening indicated as (b), it is effective to reduce a content of P, which is particularly likely to segregate in grain boundaries in the above-described chemical composition. In addition, for the hydrogen penetration prevention indicated as (c), an investigation conducted by the present inventors revealed that it is extremely effective to reduce a content of Mn in a steel.

Let F4 be defined as F4 (Mo+V+Cr)/(Mn+20P). The numerator in F4 (==Mo+V+Cr) is an index of the intragranular strengthening (equivalent to (a) described above). The denominator in F4(=Mn+20P) is an index of the grain-boundary embrittlement and the hydrogen penetration (equivalent to (b) and (c) described above). A large denominator in F4 means that a strength of grain boundaries is low, or that hydrogen is liable to penetrate a resulting carburized bearing.

Even when an intragranular strengthening index (the numerator in F4) is large, if the index of the grain-boundary embrittlement and the hydrogen penetration index (the denominator in F4) is large, a synergetic effect of an intragranular strengthening mechanism, a grain-boundary strengthening mechanism, and a hydrogen-penetration-prevention mechanism is not obtained, and thus a rolling contact fatigue life of the carburized bearing under a hydrogen-generating environment is not improved sufficiently.

Specifically, if F4 is less than 2.00, a sufficient rolling contact fatigue life of the carburized bearing under a hydrogen-generating environment is not obtained.

On the precondition that contents of elements in a chemical composition fall within the respective ranges according to the present embodiment and satisfy Formula (1) to Formula (3), when F4 is 2.00 or more, the synergetic effect of the intragranular strengthening mechanism, the grain-boundary strengthening mechanism, and the hydrogen-penetration-prevention mechanism is obtained. As a result, a sufficient rolling contact fatigue life of a resulting carburized bearing under a hydrogen-generating environment is obtained.

[Oxides of Carburized Bearing]

Even when contents of elements in a chemical composition of a core portion of a carburized bearing fell within the respective ranges according to the present embodiment and satisfied Formula (1) to Formula (4), there were still some cases where a rolling contact fatigue life of a resulting carburized bearing under a hydrogen-generating environment was low. Therefore, the present inventors conducted further studies and investigations. As a result, the present inventors found that on the precondition that contents of elements in the chemical composition of the core portion fall within the respective ranges according to the present embodiment and satisfy Formula (1) to Formula (4), and in addition, a proportion of a total area of CaO—CaS—MgO—$Al_2O_3$ composite oxides with respect to a total area of oxides (hereinafter, this proportion is referred to as "specified oxides proportion RA") in the carburized bearing is 30.0% or more, an excellent rolling contact fatigue life of the carburized bearing under a hydrogen-generating environment is obtained. This point is described hereunder.

In the present description, among inclusions in a carburized bearing, when the mass % of each inclusion is taken as 100%, an inclusion in which a content of oxygen is, in mass %, 1.0% or more, is defined as an "oxide".

The oxides are, for example, $Al_2O_3$, composite oxides containing MgO and $Al_2O_3$ (hereinafter, also referred to as "MgO—$Al_2O_3$ composite oxides"), composite oxides containing CaO and/or CaS and $Al_2O_3$ (hereinafter, also referred to as "CaO—CaS—$Al_2O_3$ composite oxides"), and composite oxides containing CaO and/or CaS and MgO and $Al_2O_3$ (CaO—CaS—MgO—$Al_2O_3$ composite oxides).

In addition, among the aforementioned oxides, composite oxides containing CaO and/or CaS and MgO and $Al_2O_3$ are defined as "CaO—CaS—MgO—$Al_2O_3$ composite oxides".

Oxides are liable to serve as an origin of a crack during use of a carburized bearing under a hydrogen-generating environment. Therefore, it has been considered that oxides are liable to reduce a rolling contact fatigue life of a carburized bearing under a hydrogen-generating environment.

However, as mentioned above, various types of oxides can exist in a carburized bearing. The present inventors considered that it may be possible to suppress a decrease in a rolling contact fatigue life of a carburized bearing under a hydrogen-generating environment depending on the type of oxides. Therefore, the present inventors investigated the relation between the type of oxides and a rolling contact fatigue life of a carburized bearing under a hydrogen-generating environment. As a result, the present inventors obtained the following findings, (1) Among the oxides, the particle sizes of CaO—CaS—$Al_2O_3$ composite oxides are larger than the particle sizes of other oxides. Therefore, among the oxides, if the proportion of CaO—CaS—$Al_2O_3$ composite oxides is large, a rolling contact fatigue life of a carburized bearing under a hydrogen-generating environment decreases, (2) Among the oxides, the particle sizes of $Al_2O_3$ and MgO—$Al_2O_3$ composite oxides are small. Therefore, if $Al_2O_3$ and MgO—$Al_2O_3$ composite oxides are simple substances, the influence thereof on the rolling contact fatigue life under a hydrogen-generating environment is small. However, $Al_2O_3$ and MO—$Al_2O_3$ composite oxides agglomerate and form clusters (agglomerates of a plurality of $Al_2O_3$ particles, agglomerates of a plurality of MgO—$Al_2O_3$ composite oxides). The sizes of the clusters become large. Therefore, the greater the amount of $Al_2O_3$ or MgO—$Al_2O_3$ composite oxides, the greater the decrease in a rolling contact fatigue life of a carburized bearing under a hydrogen-generating environment.

(3) On the other hand, among oxides, the particle sizes of CaO—CaS—MgO—$Al_2O_3$ composite oxides are smaller than the particle sizes of CaO—CaS—$Al_2O_3$ composite oxides, and it is difficult for CaO—CaS—MgO—$Al_2O_3$ composite oxides to become clustered in the way that $Al_2O_3$ and MgO—$Al_2O_3$ composite oxides do. Therefore, the influence of CaO—CaS—MgO—$Al_2O_3$ composite oxides on a rolling contact fatigue life of a carburized hearing under a hydrogen-generating environment is small.

In consideration of the above (1) to (3), the present inventors considered that by increasing the proportion of CaO—CaS—MgO—$Al_2O_3$ composite oxides among oxides in a carburized bearing, the sizes of oxides in the carburized hearing can be prevented from becoming large, and a rolling contact fatigue life of a resulting carburized bearing under a hydrogen-generating environment can be increased.

CaO—CaS—MgO—$Al_2O_3$ composite oxides are produced when CaO—CaS—$Al_2O_3$ composite oxides are modified. The proportion (%) of the total area of CaO—CaS—MgO—$Al_2O_3$ composite oxides to the total area of oxides, is defined as "specified oxides proportion RA". If the specified oxides proportion RA is high, it means the amount of CaO—CaS—MgO—$Al_2O_3$ composite oxides is large and the amount of CaO—CaS—$Al_2O_3$ composite oxides, $Al_2O_3$ and MgO—$Al_2O_3$ composite oxides is small. Therefore, the present inventors considered that by increasing the specified oxides proportion RA, a rolling contact fatigue life of a carburized bearing under a hydrogen-generating environment can be increased.

Thus, the present inventors produced a carburized bearing in which contents of elements in the chemical composition fell within the respective ranges described above, and satisfied Formula (1) to Formula (4). The present inventors then investigated a rolling contact fatigue life of the carburized bearing under a hydrogen-generating environment. As a result the present inventors found that, on the precondition that contents of elements in the chemical composition of a core portion fail within the respective ranges according to the present embodiment and satisfy Formula (1) to Formula (4), and that the number density of coarse oxides, to be described later, is 15.0 pieces/mm$^2$ or less if the specified oxides proportion RA is 30.0% or more, the rolling contact fatigue life of the carburized bearing under a hydrogen-generating environment significantly increases.

[Number Density of Coarse Oxides in Steel]

In the steel of the present embodiment, in addition, among the oxides in the carburized bearing, a number density of oxides having an equivalent circle diameter of 20.0 μm or more is made 15.0 pieces/mm$^2$ or less. In the present description, oxides having an equivalent circle diameter of 20.0 μm or more are also referred to as "coarse oxides".

As described above, by making the specified oxides proportion RA 300% or more, the proportion of CaO—CaS—MgO—$Al_2O_3$ composite oxides among the oxides becomes large. The particle sizes of CaO—CaS—MgO—$Al_2O_3$ composite oxides are small compared to CaO—CaS—$Al_2O_3$ composite oxides. In addition, it is difficult for CaO—CaS—MgO—$Al_2O_3$ composite oxides to cluster in the way that $Al_2O_3$ and MgO—$Al_2O_3$ composite oxides do. Therefore, the sizes of oxides in the carburized bearing can be kept small.

In the carburized bearing oldie present embodiment, on the precondition that contents of elements in the chemical composition of the core portion fall within the respective ranges according to the present embodiment and satisfy Formula (1) to Formula (4), and that the specified oxides proportion RA in the carburized bearing is 30.0% or more, in addition, the number density of oxides (coarse oxides) having an equivalent circle diameter of 20.0 μm or more is 15.0 pieces/mm$^2$ or less. In this case, a rolling contact fatigue life of a resulting carburized bearing under a hydrogen-generating environment significantly increases.

The carburized hearing according to the present embodiment made based on the above findings has the following configuration.

A carburized bearing, including:

a carburized layer formed in an outer layer of the carburized bearing; and a core portion inner than the carburized layer, wherein the core portion consists of, in mass %:

C: 0.25 to 0.45%,

Si: 0.10 to 0.50%,

Mn: 0.40 to 0.70%,

P: 0.015% or less,

S: 0.005% or less,

Cr: 0.80 to 1.50%,

Mo: 0.17 to 0.30%,

V: 0.24 to 0.40%,

Al: 0.005 to 0.100%,

N: 0.0300% or less,

B: 0.0015% or less, and the balance being Fe and impurities, and on a precondition that a content of each element of the core portion falls within at range described above, Formula (1) to Formula (4) are satisfied, wherein a concentration of C of a surface of the carburized bearing is, in mass %, 0.70 to 1.20%, a Rockwell hardness C scale HRC of the surface of the carburized bearing is 58.0 to 65.0, when composite inclusions containing CaO and/or CaS, MgO and $Al_2O_3$ are defined CaO—Ca—MgO—$Al_2O_3$ composite oxides, a proportion of a total area of the CaO—CaS—MgO—$Al_2O_3$ composite oxides with respect to a total area of oxides in the carburized bearing is 30.0% or more; and among oxides in the carburized bearing, a number density of oxides having an equivalent circle diameter of 20.0 μm or more is 15.0 pieces/mm$^2$ or less:

$$1.50<0.4Cr+0.4Mo+4.5V<2.45 \quad (1)$$

$$2.20<2.7C+0.4Si+Mn+0.45Ni+0.8Cr+Mo+V<3.50 \quad (2)$$

$$Mo/V\geq 0.58 \quad (3)$$

$$(Mo+V+Cr)/(Mn+20P)\geq 2.00 \quad (4)$$

where each symbol of an element in Formula (1) to Formula (4) is to be substituted by a content of a corresponding element in mass %, and is to be substituted by "0" if the corresponding element is not contained.

The carburized bearing according to wherein the core portion further contains, in lieu of a part of Fe, one or more types of element selected from the group consisting of:

Cu: 0.20% or less,

Ni: 0.20% or less,

B: 0.0050%, or less,

Nb: 0.100% or less, and

Ti: 0.100% or less.

The carburized bearing according to the present embodiment will be described below in detail. The sign "%" relating to elements means mass % unless otherwise noted.

[Carburized Bearing]

The carburized bearing according to the present embodiment means a bearing subjected to carburizing. Carburizing herein means a treatment in which carburizing-quenching and tempering are performed.

A bearing means a component of a rolling bearing. Examples of the bearing include a race, a bearing washer, and a rolling element. The race may be an inner race or an outer race, and the bearing washer may be a shaft washer, a housing washer, a central washer, or an aligning housing washer. The race and the bearing washer are not limited to a specific race and a specific bearing washer as long as the race and the bearing washer are members each having a raceway. The element may be a ball or a roller. Examples of the roller include, a cylindrical roller, a long, cylindrical roller, a needle roller, a tapered roller, and, a convex roller.

A carburized bearing includes a carburized layer that is formed by the carburizing and a core portion that is inner than the carburized layer. A depth of the carburized layer is not limited to a specific depth; however, an example of the depth from a surface of the carburized layer is 0.2 mm to 5.0 mm. The core portion has the same chemical composition as the chemical composition of the steel to be a starting material of a carburized bearing according to the present embodiment. The carburized layer and the core portion of the carburized bearing are easily distinguishable by performing microstructure observation. Specifically, it is well-known by those skilled in the art that, in a cross section perpendicular to the longitudinal direction of the carburized bearing, the contrast of the carburized layer and the contrast of the core portion differ from each other. Therefore, it is easy to distinguish the carburized layer and the core portion in the carburized bearing.

[Chemical Composition of Core Portion of Carburized Bearing]

The chemical composition oldie core portion of the carburized bearing contains the following elements.

C: 0.25 to 0.45%

Carbon (C) increases a hardenability of steel. C therefore increases the strength of a core portion of a carburized bearing and increases the toughness of the core portion. In addition, C increases the wear resistance of the carburized bearing by forming fine carbides and carbo-nitrides through carburizing. Moreover, C forms small V precipitates mainly during carburizing. Small V precipitates trap hydrogen during use of the carburized hearing under a hydrogen-generating environment. As a result, small V precipitates increase a rolling contact fatigue life of the carburized bearing under a hydrogen-generating environment. If a content of C is less than 0.25%, the effects described above are not Obtained sufficiently even when contents of the other elements fall within the respective ranges according to the present embodiment. On the other hand, if the content of C is more than 0.45%, even when contents of the other elements fall within the respective ranges according to the present embodiment, V precipitates are not dissolved completely and partly remain in a production process of the steel to be a starting material of a carburized bearing. The V precipitates remaining in the steel grow during the production process of the carburized bearing. As a result, coarse V precipitates are formed in the carburized bearing. The coarse V precipitates in the carburized bearing have a poor performance in trapping hydrogen. Therefore, the coarse V precipitates cause a change in structure during use of the carburized hearing under a hydrogen-generating environment. In addition, the coarse V precipitates also serve as an origin of a crack. As a result, a rolling contact fatigue life of the carburized bearing under a hydrogen-generating environment is decreased. Therefore, the content of C is to be 0.25 to 0.45%. A lower limit of the content of C is preferably 0.28%, more preferably 0.30%, and still more preferably 0.32%. An upper limit of the content of C is preferably 0.43%, more preferably 0.41%, and still more preferably 0.40%.

Si: 0.10 to 0.50%

Silicon (Si) increases the hardenability of the steel, and in particular increases the temper softening resistance of the carburized layer of the carburized bearing. In addition, Si increases the rolling contact fatigue strength of the carburized bearing. Si is additionally dissolved in ferrite in the steel to strengthen the ferrite. If a content of Si is less than 0.10%, the effects described above are not obtained sufficiently even when contents of the other elements fall within the respective ranges according to the present embodiment. On the other hand, if the content of Si is more than 0.50%, even when contents of the other elements fall within the respective ranges according to the present embodiment, the rolling contact fatigue strength of the carburized bearing will be saturated. In addition, if the content of Si is more than 0.50%, the toughness and machinability of the steel being a starting material of the carburized bearing will significantly decrease. Therefore, the content of Si is to be 0.10 to 0.50%. A lower limit of the content of Si is preferably 0.12%, more preferably 0.15%, and still more preferably 0.18%. An upper limit of the content of Si is preferably 0.48%, more preferably 0.45%, still more preferably 0.35%, and even still more preferably 0.30%.

Mn: 0.40 to 0.70%

Manganese (Mn) increases the hardenability of the steel. This increases the strength of a core portion of a carburized, bearing, increasing a rolling contact fatigue life under a hydrogen-generating environment. If a content of Mn is less than 0.40%, the effects described above are not obtained sufficiently even when contents of the other elements fall within the respective ranges according to the present embodiment. On the other hand, if the content of Mn is more than 0.70%, a hardness of the steel being a starting material of the carburized bearing becomes excessively high, decreasing a machinability of the steel even when contents of the other elements fall within the respective ranges according to the present embodiment. A content of Mn being more than 0.70% additionally makes hydrogen liable to penetrate the carburized bearing during use of the carburized, bearing under a hydrogen-generating environment, decreasing a rolling contact fatigue life under a hydrogen-generating environment of the carburized bearing. Therefore, the content of Mn is to be 0.40 to 0.70%. A lower limit of the content of Mn is preferably 0.42%, more preferably 0.44%, and still more preferably 0.46%. An upper limit of the content of Mn is preferably 0.68%, more preferably 0.66%, and still more preferably 0.64%.

P: 0.015% or Less

Phosphorus (P) is an impurity that is contained unavoidably. In other words, a content of P is more than 0%. P segregates in grain boundaries, decreasing grain boundary strength. If the content of P is more than 0.015%, P segregates in an excess amount in grain boundaries even when contents of the other elements fall within the respective ranges according to the present embodiment. In this case, the grain boundary strength is decreased. As a result, a rolling contact fatigue life of the carburized bearing under a hydrogen-generating environment is decreased. Therefore, the content of P is to be 0.015% or less. An upper limit of the content of P is preferably 0.013%, and more preferably 0.010%. The content of P is preferably as low as possible. However, an excessive reduction of the content of P raises a production cost. Therefore, with consideration given to normal industrial production, a lower limit of the content of P is preferably 0.001%, and more preferably 0.002%.

S: 0.005% or Less

Sulfur (S) is an impurity that is contained unavoidably. In other words, a content of S is more than S produces sulfide-based inclusions. Coarse sulfide-based inclusions are liable to serve as an origin of a crack during use of the carburized bearing under a hydrogen-generating environment, if the content of S is more than 0.005%, the sulfide-based inclusions become coarse, even when contents of the other elements fall within the respective ranges according to the present embodiment. As a result, a rolling contact fatigue life of the carburized bearing under a hydrogen-generating environment decreases. Therefore, the content of S is to be 0.005% or less. An upper limit of the content of S is preferably 0.004%. The content of S is preferably as low as possible. However, an excessive reduction of the content of S raises to production cost. Therefore, with consideration given to normal industrial production, a lower limit of the content of S is preferably 0.001%, and more preferably 0.002%.

Cr: 0.80 to 1.50%

Chromium (Cr) increases a hardenability of the steel. This increases the strength of a core portion of a carburized bearing. When contained in combination with V and Mo, Cr additionally accelerates production of small V precipitates during carburizing. As a result, the wear resistance of the carburized bearing increases. In addition, a rolling contact fatigue life of the carburized bearing under a hydrogen-generating environment increases. If a content of Cr is less than 0.80%, the effects described above are not obtained sufficiently. On the other hand, if the content of Cr is more than 1.50%, carburizing properties of carburizing are decreased even when contents of the other dements fall within the respective ranges according to the present embodiment. In this case, a sufficient wear resistance of a carburized bearing is not obtained. Therefore, the content of Cr is to be 0.80 to 1.50%. A lower limit of the content of Cr is preferably 0.85%, more preferably 0.88%, and still more preferably 0.90%. An upper limit of the content of Cr is preferably 1.45%, more preferably 1.40%, and still more preferably 1.35%.

Mo: 0.17 to 0.30%

As with Cr, molybdenum (Mo) increases a hardenability of the steel. This increases the strength of a core portion of a carburized bearing. When contained in combination with V and Cr, Mo additionally accelerates production of small V precipitates during carburizing. As a result, the wear resistance of the carburized bearing increases. In addition, a rolling contact fatigue life of the carburized bearing under a hydrogen-generating environment increases. If a content of Mo is less than 0.17%, the effects described above are not obtained sufficiently. On the other hand, if the content of Mo is more than 0.30%, a strength of the steel being a starting material of the carburized bearing becomes excessively high, decreasing a machinability of the steel even when contents of the other elements fall within the respective range, according to the present embodiment. Therefore, the content of Mo is to be 0.17 to 0.30%. A lower limit of the content of Mo is preferably 0.18%, more preferably 0.19%, and still more preferably 0.20%. An upper limit of the content of Mo is preferably 0.29%, more preferably 0.28%, and still more preferably 0.27%.

V: 0.24 to 0.40%

Vanadium (V) forms small V precipitates in the carburized bearing. Small V precipitates trap hydrogen penetrating into the carburized bearing during use of the carburized bearing under a hydrogen-generating environment Equivalent circle diameters of small V precipitates in the carburized bearing are small diameters of 150 nm or less. Therefore, even after small V precipitates trap hydrogen, the small V precipitates resist serving as an origin of a change in structure. As a result, a rolling contact fatigue life of the carburized bearing under a hydrogen-generating environment can be increased. The small V precipitates also increase the wear resistance of the carburized bearing. If a content of V is less than 0.24%, the effects described above are not. Obtained sufficiently even when contents of the other elements fall within the respective ranges according to the present embodiment. On the other hand, if the content of V is more than 0.40% even when contents of the other elements fall within the respective ranges according u the present embodiment, in some cases, coarse V precipitates may form in the carburized bearing. In this case, the toughness of the core portion of the carburized bearing decreases. Moreover, coarse V precipitates in a carburized bearing have poor performance in trapping hydrogen. Therefore, coarse V precipitates are liable to cause a change in structure during use of the carburized bearing under a hydrogen-generating environment. Coarse V precipitates additionally serve as an origin of a crack. Therefore, the rolling contact fatigue life of the carburized bearing under a hydrogen-generating environment decreases. Therefore, the content of V is to be 0.24 to 0.40%. A lower limit of the content of V is preferably 0.25%, more preferably 0.26%, and still more preferably 0.27%. An upper limit of the content of V is preferably 0.39%, more preferably 0.38%, and still more preferably 0.36%.

Al: 0.005 to 0.100%

Aluminum (Al) deoxidizes the steel during the steelmaking process, Al also combines with N in the steel to form AlN, and thereby suppresses a decrease in the hot workability of the steel caused by dissolved N. If a content of Al is less than 0.005%, this effect is not obtained sufficiently even when contents of the other elements fail within the respective ranges according to the present embodiment. On the other hand, if the content of Al is more than 0.100%, even when contents of the other elements fall within the respective ranges according to the present embodiment, clustered coarse oxides are produced. The clustered coarse oxides serve as an origin of a crack under a hydrogen-generating environment. Therefore, a rolling contact fatigue life of the carburized bearing under a hydrogen-generating environment decreases. Therefore, the content of Al is to be 0.005 to 0.100%, lower limit of the content of Al is preferably 0.008%, and more preferably 0.010%. An upper limit of the content of Al is preferably 0.080%, more preferably 0.070%, and still more preferably 0.060%. The content of Al as used herein means a content of Al in total (Total Al).

N: 0.0300% or Less

Nitrogen (N) is an impurity that is contained unavoidably. In other words, a content of N is more than 0%. N is dissolved in the steel decreasing a hot workability of the steel. If the content of N is, more than 0.0300%, even when contents of the other elements fall within the respective ranges according to the present embodiment, the hot workability of the steel significantly decreases. Therefore, the content of N is to be 0.0300% or less. An upper limit of the content of N is preferably 0.0250%, and more preferably 0.0200%. The content of N is preferably as low as possible. However, an excessive reduction of die content of N raises a production cost. Therefore, with consideration given to normal industrial production, a lower limit of the content of N is preferably 0.0001%, and more preferably 0.0002%.

O (Oxygen): 0.0015% or Less

Oxygen (O) is an impurity that is contained unavoidably. In other words, a content of O is more than 0%. O combines with other elements in the steel to produce coarse oxides (including oxides that coarsen due to clustering). Coarse oxides serve as an origin of a crack under a hydrogen-generating environment. As a result, a rolling contact fatigue life of the carburized bearing under a hydrogen-generating environment is decreased. If the content of O is more than 0.0015%, a rolling contact fatigue life of the carburized bearing under a hydrogen-generating environment is significantly decreased even when contents of the other elements fall within the respective ranges according to the present embodiment. Therefore, the content of O is to be 0.0015% or less. An upper limit of the content of O is preferably 0.0013%, and more preferably 0.0012%. The content of is preferably as low as possible. However, an excessive reduction of the content of O raises a production cost. Therefore, with consideration Riven to normal industrial production, a lower limit of the content of O is preferably 0.0001%, and more preferably 0.0002%.

The balance of the chemical composition of the core portion of the carburized bearing according to the present embodiment is Fe and impurities. The impurities herein mean those that are mixed in from ores and scraps as raw materials or from a production environment when the steel to be a starting material of the carburized bearing is produced industrially, and that are allowed to be in the steel within ranges in which the impurities have no adverse effect on the carburized bearing according to the present embodiment.

[Optional Elements]

The chemical composition of the core portion of the carburized bearing according to the present embodiment may further contain, in lieu of a part of Fe, one or more types of element selected from the group consisting of Cu: 0.20% or less,
Ni: 0.20% or less,
B: 0.0050% or less,
Nb: 0.100% or less, and
Ti: 0.100% or less.

These elements are optional elements and all increase the strength of the carburized bearing.

Cu: 0.20% or Less

Copper (Cu) is an optional element and need not be contained. In other words, a content of Cu may be 0%. When contained, Cu increases the hardenability of the steel. Therefore, the strength of the core portion of a carburized bearing increases. A trace amount of Cu contained provides the effect described above to some extent. However, if the content of Cu is more than 0.20%, the strength of the steel to be a starting material of a carburized bearing is it excessively even when contents of the other elements fall within the respective ranges according to the present embodiment. As a result, the machinability of the steel to be a starting material decreases. Therefore, the content of Cu is to be 0 to 0.20%, and when contained is to be 0.20% or less. In other words, the content of Cu when contained is to be more than 0 to 0.20%. A lower limit of the content of Cu is preferably 0.01%, more preferably 0.02%, still more preferably 0.03%, and even still more preferably 0.05%. An upper limit of the content of Cu is preferably 0.18% and more preferably 0.16%.

Ni: 0.20% or Less

Nickel (Ni) is an optional element and need not be contained. In other words, a content of Ni may be 0%. When contained, Ni increases the hardenability of the steel. Therefore, the strength of the core portion of a carburized bearing increases. A trace amount of Ni contained provides the effect described above to some extent. However, if the content of Ni is more than 0.20%, the strength of the steel to be a starting material of a carburized bearing is increased excessively even when contents of the other elements fall within the respective ranges according to the present embodiment. As a result, the machinability of the steel to be a starting material is decreased. Therefore, the content of Ni is to be 0 to 0.20%, and when contained is to be 0.20% or less. In other words, the content of Ni when contained is to be more than 0 to 0.20%. A lower limit of the content of Ni is preferably 0.01%, more preferably 0.02%, still more preferably 0.03%, and even still more preferably 0.05%. An upper limit of the content of Ni is preferably 0.18%, and more preferably 0.16%.

B: 0.0050% or Less

Boron (B) is an optional element and need not be contained. In other words, a content of B may be 0%. When contained, B increases the hardenability of the steel. Therefore, the strength of the core portion of a carburized bearing increases. In addition, B prevents P from segregating in grain boundaries. A trace amount of B contained provides the effects described above to some extent. However, if the content of B is more than 0.0050%, B nitride (BN) is formed even when contents of the oilier elements fall within the respective ranges according to the present embodiment. In this case, the toughness of the core portion of the carburized bearing decreases. Therefore, the content of B is to be 0 to 0.0050%, and when contained is to be 0.0050% or less. In other words, the content of B when contained is to be more than 0 to 0.0050%. A lower limit of the content of B is preferably 0.0001%, more preferably 0.0003%, still more preferably 0.0005%, and even still more preferably 0.0010%. An upper limit of the content of B is preferably 0.0030%, and more preferably 0.0025%.

Nb: 0.100% or Less

Niobium (Nb) is an optional element and need not be contained. In other words, a content of Nb may be 0%. When contained, Nb combines with C and N the steel to form Nb precipitates such as carbides, nitrides, and carbo-nitrides. The Nb precipitates exert precipitation strengthening to increase the strength of the carburized bearing. A trace amount of Nb contained provides the effect described above to some extent. However, if the content of Nb is more than 0.100%, the toughness of the core portion of the carburized bearing decreases even when contents of the other elements fall within the respective ranges according to the present embodiment. Therefore, the content of Nb is to be 0 to 0.100%, and when contained is to be 0.100% or less. In other words, the content of Nb when contained is to be more than 0 to 0.100%. A lower limit of the content of Nb is preferably 0.005%, and more preferably 0.010%. An upper limit of the content of Nb is preferably 0.080%, and more preferably 0.070%.

Ti: 0.100% or Less.

Titanium (Ti) is an optional element and need not be contained. In other words, a content of Ti may be 0%. When contained, similarly to Nb, Ti forms precipitates such as carbides, nitrides, and carbo-nitrides. The Ti precipitates exert precipitation strengthening to increase the strength of the carburized bearing. A trace amount of Ti contained provides the effect described above to some extent. However, if the content of Ti is more than 0.100%, the toughness of the core portion of the carburized bearing decreases even when contents of the other elements fall within the respective ranges according to the present embodiment. Therefore, the content or Ti is to be 0 to 0.100%, and when contained is to be 0.100% or less. In other words, the content of Ti when contained is to be more than 0 to 0.100%. A lower limit of the content of Ti is preferably 0.005%, and more preferably 0.010%. An upper limit of the content of Ti is preferably 0.080%, and more preferably 0.070%.

[Formula (1) to Formula (4)]

The chemical composition of the core portion of the carburized bearing according to the present embodiment further satisfies the following Formula (1) to Formula (4):

$$1.50<0.4Cr+0.4Mo+4.5V<2.45 \quad (1)$$

$$2.20<2.7C+0.4Si+Mn+0.45Ni+0.8Cr+Mo+V<3.50 \quad (2)$$

$$Mo/V\geq 0.58 \quad (3)$$

$$(Mo+V+Cr)/(Mn+20P)\geq 2.00 \quad (4)$$

where each symbol of an element in Formula (1) to Formula (4) is to be substituted by a content of a corresponding element in mass %, and is to be substituted by "0" if the corresponding element is not contained. Formula (1) to Formula (4) will be described below.

[Formula (1)]

The chemical composition of the core portion of the carburized bearing according to the present embodiment satisfies Formula (1):

$$1.50<0.4Cr+0.4Mo+4.5V<2.45 \quad (1)$$

where symbols of elements in Formula (1) are to be substituted by con corresponding elements (mass %).

Let F1 be defined as F1=0.4Cr+0.4Mo+4.5V. F1 is an index relating to an amount of produced small V precipitates. As mentioned above, in the present description, the term "small V precipitates" means V precipitates having an equivalent circle diameter of 150 nm or less.

Production of small V precipitates is accelerated by V as well as Cr and Mo. Cr produces Fe-based carbides such as cementite or Cr carbides in a temperature region lower than a temperature region in which V precipitates are produced. Mo produces Mo carbides ($Mo_2C$) in a temperature region lower than the temperature region in which V precipitates are produced. As the temperature rises, the Fe-based carbides, Cr carbides and Mo carbides are dissolved to serve as nucleation sites of precipitation for V precipitates.

If F1 is 1.50 or less, even when the contents of the elements fall within the respective ranges according to the present embodiment and satisfy Formula (2) to Formula (4), small V precipitates are not sufficiently produced. Therefore, the rolling contact fatigue life of the carburized bearing under a hydrogen-generating environment decreases.

On the other hand, if F1 is 2.45 or more, even when the contents of the elements fall within the respective ranges according to the present embodiment, and satisfy Formula (2) to Formula (4), coarse V precipitates are produced in the carburized bearing. Coarse V precipitates have poor performance in trapping hydrogen. Therefore, coarse V precipitates are liable to cause a change in structure, and in addition, coarse V precipitates also serve as an origin of a crack. Therefore, the rolling contact fatigue life of the carburized bearing under a hydrogen-generating environment decreases.

When F1 is more than 1.50 and less than 2.45, on the precondition that the contents of the elements fall within the respective ranges according to the present embodiment and satisfy Formula (2) to Formula (4), small V precipitates are produced adequately in a carburized bearing produced from the steel as a starting material. Small V precipitates trap hydrogen, and thus suppress the occurrence of hydrogen cracking Therefore, it is difficult for a change in structure to occur that is attributable to hydrogen cracking under a hydrogen-generating environment. As a result, the rolling contact fatigue life of the carburized bearing under a hydrogen-generating environment increases.

A lower limit of F1 is preferably 1.52, more preferably 1.54, and still more preferably 1.60. An upper limit of F1 is preferably 2.44, more preferably 2.43, still more preferably 2.35, even still more preferably 2.30, even still more preferably 2.25, and even still more preferably 2.20. A numerical value of F1 is to be a value obtained by rounding off F1 to the third decimal place.

[Formula (2)]

The chemical composition of the core portion of the carburized bearing according to the present embodiment further satisfies Formula (2):

$$2.20<2.7C+0.4Si+Mn+0.45Ni+0.8Cr+Mo+V<3.50 \quad (2)$$

where symbols of elements in Formula (2) are to be substituted by contents of corresponding elements (mass %), and are to be substituted by "0" if a corresponding element is not contained.

Let F2 be defined as F2=2.7C+0.4Si+Mn+0.45Ni+0.8Cr+Mo+V. Elements shown in F2 each increase a hardenability of the steel. F2 is thus an index of a strength of the core portion of the carburized bearing, and a machinability of the steel to be a starting material of a carburized bearing.

If F2 is 2.20 or less, even when contents of elements fall within the respective ranges according to the present embodiment and satisfy Formula (1), Formula (3), and Formula (4), a hardenability of a resulting steel is insufficient. Therefore, a sufficient strength of the core portion of the carburized heaving is not obtained. In this case, a sufficient rolling contact fatigue life of the carburized bearing under a hydrogen-generating environment is not obtained.

On the other hand, if F2 is 3.50 or more, even when the contents of the elements fall within the respective ranges according to the present embodiment and satisfy Formula (1), Formula (3), and Formula (4), the steel is liable to become hardened excessively. As a result, a sufficient machinability of the steel to be a starting material of the carburized bearing is not obtained.

When F2 is more than 2.20 and less than 3.50, on the precondition that contents of elements fall within the respective ranges according to the present embodiment and satisfy Formula (1), Formula (3), and Formula (4), a strength of a core portion of a resulting carburized bearing is sufficiently increased, and a rolling contact fatigue life of the carburized bearing under a hydrogen-generating environment is sufficiently increased. A lower limit of F2 is preferably 2.25, more preferably 2.30 still more preferably 2.35, even still more preferably 2.40, even still more preferably 2.45 and even still more preferably 2.50. An upper limit of F2 is preferably 3.48, and more preferably 3.45. A numerical value of F2 is to be a value obtained by rounding off F2 to the third decimal place.

[Formula (3)]

The chemical composition of the core portion of the carburized bearing according to the present embodiment further satisfies Formula (3).

$$Mo/V\geq 0.58 \quad (3)$$

where symbols of elements in Formula (3) are to be substituted by contents of corresponding elements (mass %).

Let F3 be defined as F3=Mo/V. In the carburized bearing according to the present embodiment, as described above, F1 satisfying Formula (1) allows provision of a total content of a content of V, a content of Cr, and a content of Mo necessary to produce small V precipitates. However, production of sufficient small V precipitates further requires adjustment of the proportion of a content of V with respect to a content of Mo. Specifically, if the proportion of a content of Mo to a content of V is excessively low, Mo carbides to serve as nucleation sites of precipitations do not precipitate sufficiently before production of V precipitates. In this case, even when a content of V, a content of Cr, and a content of Mo fall within ranges of the respective contents of elements according to the present embodiment and satisfy Formula (1), small V precipitates are not produced sufficiently. Specifically, if F3 is less than 0.58, even when contents of elements fall within the respective ranges according to the present embodiment and satisfy Formula (1), Formula (2), and Formula (4), small V precipitates are not produced sufficiently. As a result, a sufficient rolling contact fatigue life of the carburized bearing under a hydrogen-generating environment is not obtained.

When F3 is 0.58 or more, and Formula (3) is satisfied, on the precondition that the contents of the elements fall within the respective ranges according to the present embodiment and satisfy Formula (1), Formula (2), and Formula (4), small V precipitates are sufficiently produced. As a result, a rolling contact fatigue life of the carburized bearing is sufficiently high under a hydrogen-generating environment. A lower limit of F3 is preferably 0.60, more preferably 0.65, still more preferably 0.70, and even still more preferably 0.76. A numerical value of F3 is to be a value obtained by rounding off F3 to the third decimal place.

[Formula (4)]

The chemical composition of the core portion of the carburized bearing according to the present embodiment further satisfies Formula (4):

$$(Mo+V+Cr)/(Mn+20P)\geq 2.00 \quad (4)$$

where symbols of elements in Formula (4) are to be substituted by contents of corresponding elements (mass %).

Let F4 be defined as F4 (Mo+V+Cr)/(Mn+20P). Small V precipitates not only trap hydrogen but also exert precipitation strengthening to strengthen, insides of grains. Therefore, a rolling contact fatigue life of the carburized bearing under a hydrogen-generating environment increases. Further, when grain boundaries can also be strengthened in a carburized bearing under a hydrogen-generating environment, the rolling contact fatigue life of the carburized hearing under the hydrogen-generating environment can be further increased. In addition, when the penetration of hydrogen to a carburized bearing under a hydrogen-generating environment can be prevented or reduced, the rolling contact fatigue life of the carburized bearing under the hydrogen-generating environment can be further increased.

That is, a rolling contact fatigue life of the carburized bearing under the hydrogen-generating environment can be further increased by a synergetic effect of three effects (a) intragranular strengthening, (b) grain-boundary strengthening, and (c) hydrogen penetration prevention. The intragranular strengthening indicated as (a) depends on a total content of a content of Mo, a content of V, and a content of Cr, as described above. Meanwhile, for the grain-boundary strengthening indicated as (b), it is of to reduce a content of P, which is particularly likely to segregate in grain boundaries in the above-described chemical composition. In addition, for the hydrogen penetration prevention indicated as (c), it is extremely effective to reduce a content of Mn in the steel.

The numerator in F4(=Mo+V+Cr) is an index of the intragranular strengthening (equivalent to (a) described above). The denominator in F4 Mn+20P) is an index of the grain-boundary embrittlement and the hydrogen penetration (equivalent to (b) and (c) described above). A large denominator in F4 means that a strength of grain boundaries is low, or that hydrogen is liable to penetrate a resulting carburized bearing. Therefore, even when an intragranular strengthening index (the numerator in F4) is large, if the grain boundary embrittlement and hydrogen penetration index (the denominator in F4) is large, a synergetic effect of an intragranular strengthening mechanism, a grain-boundary strengthening mechanism, and a hydrogen-penetration-prevention mechanism is not obtained sufficiently, and thus a rolling contact fatigue life of the carburized bearing under a hydrogen-generating environment is not improved sufficiently. Specifically, when F4 is less than 2.00, even when contents of elements in the chemical composition of the steel fall within the respective ranges according to the present embodiment and satisfy Formula (1) to Formula (3), a rolling contact fatigue life of the carburized bearing under a hydrogen-generating environment is not obtained sufficiently.

On the precondition that contents of elements in the chemical composition of the steel fall within the respective ranges according to the present embodiment and satisfy Formula (1) to Formula (3), when F4 is 2.00 or more, a rolling contact fatigue life of the carburized bearing under a hydrogen-generating environment is obtained sufficiently. A lower limit of F4 is preferably 2.20, more preferably 2.30, still more preferably 2.35, even still more preferably 2.40, and even still more preferably 2.50. A numerical value of F4 is to be a value Obtained by rounding off F4 to the third decimal place.

[Method for Measuring Chemical Composition of Core Portion of Carburized Bearing]

The chemical composition of the core portion of the carburized bearing can be measured by a well-known component analysis method. For example, a drill is used to generate machined chips from the core portion of die carburized bearing, and the machined chips are collected. The collected machined chips are dissolved in acid to obtain a liquid solution. The liquid solution is subjected to ICP-AES (Inductively Coupled Plasma Atomic Emission Spectrometry) to perform elementary analysis of the chemical composition. The content of C and the content of S are determined by as well-known high-frequency combustion method (combustion-infrared absorption method). The content of N is determined using a well-known inert gas fusion-thermal conductivity method. The content of O is determined using a well-known inert gas fusion-nondispersive infrared absorption method.

[Microstructure of Core Portion of Carburized Bearing]

A microstructure of a core portion of a carburized bearing is a martensitic structure. Martensitic structure as used herein means a structure an area fraction of martensite of which is 90.0% or more. The meaning of "martensite" as used herein also includes tempered martensite. A carburized layer is formed in an outer layer of the carburized bearing. Therefore, for those skilled in the art the fact that a microstructure of as core portion of a carburized bearing is the above-described martensitic structure is technical matter that is well known, and is obvious. Note that, the term "martensite" as used herein includes martensite, tempered martensite, bainite, and tempered bainite also.

An area fraction of martensite in a microstructure of the core portion of a carburized hearing can be determined by the following method. From the core portion of the carburized bearing, a sample is taken. The surface of the sample is etched with a picral. In the surface after etching, three freely-selected visual fields are observed in a secondary electron image using a scanning electron microscope (SEM). The area of each visual field is 400 $\mu m^2$ (magnification of 5000×). In the SEM observation, martensite, ferrite, and pearlite, can be distinguished as follows. Specifically, a phase having a lamellar structure can be identified as ferrite. A phase without a substructure in the grain can be identified as ferrite. A phase including a lath-like structure can be identified as martensite. The total area of martensite in the three visual fields of the sample is determined. A proportion of the thus-determined total area of martensite with respect to the total area of the three visual fields is defined as the area fraction (%) of martensite.

[Concentration of C and Rockwell Hardness C Scale HRC of Surface of Carburized Bearing]

A concentration of C, and a Rockwell hardness C scale HRC of a surface of a carburized bearing are as follows. Note that the concentration of C and the Rockwell hardness C scale HRC of the surface of the carburized bearing of the present embodiment fall within a well-known range, respectively.

Concentration of C of Surface: 0.70 to 1.20% in Mass %

A concentration of C of the surface of the carburized bearing is to be 0.70 to 1.20%. If the concentration of C of the surface is excessively low, surface hardness becomes excessively low, and wear resistance is decreased. On the other hand, if the concentration of C of the surface is excessively high, coarse carbo-nitrides and the like are produced, decreasing a rolling contact fatigue life under a hydrogen-generating environment. When the concentration of C. of the surface is 0.70 to 1.20%, the carbonitrided bearing is excellent in wear resistance and rolling contact fatigue life under a hydrogen-generating environment. A lower limit of the concentration of C of the surface is preferably 0.75%, and more preferably 0.80%. An upper limit of the concentration of C of the surface is preferably 1.10%, more preferably 1.05%, and still more preferably 1.00%.

The concentration of C of the surface is measured by the following method, An electron probe micro analyzer (EPMA) is used to measure a concentration of C (mass %) at a freely-selected surface position of the carburized bearing, from the surface down to a depth of 100 μm with a 1.0-μm pitch. An arithmetic mean value of the measured concentrations C is defined as a surface concentration of C (mass %).

Rockwell Hardness C Scale HRC of Surface: 58.0 to 65.0

The Rockwell hardness C scale HRC of the surface of the carburized bearing is to be 58.0 to 65.0. If the Rockwell hardness C scale HRC of the surface is excessively low, a wear resistance of carburized bearing is decreased. On the other hand, if the Rockwell hardness C scale HRC of the surface is excessively high, it becomes easy for fine cracks to occur and propagate. In this case, a rolling contact fatigue life under a hydrogen-generating environment is decreased. When the Rockwell hardness C scale HRC of the surface is 58.0 to 65.0, an excellent wear resistance and an excellent rolling contact fatigue life under a hydrogen-generating environment are obtained. A lower limit, of the Rockwell hardness C scale HRC of the surface is preferably 58.5, and more preferably 59.0. An upper limit of the Rockwell hardness C scale HRC of the surface is preferably 64.5, and more preferably 64.3.

A Rockwell hardness C scale HRC of a carburized bearing is measured by the following method. On a surface of the carburized bearing, four freely-selected measurement: positions are specified. At the four specified measurement positions, the Rockwell hardness C scale (HRC) test using C scale is conducted in conformity to JIS 2245 (2011). An arithmetic mean value of four obtained Rockwell hardness C scale HRC values is defined as the Rockwell hardness C scale HRC of the surface.

[Oxides in Carburized Bearing]

In the carburized bearing according to the present embodiment, on the precondition that contents of elements in the chemical composition of the core portion fall within the respective ranges according to the present embodiment and satisfy Formula (1) to Formula (4), and that the concentration off of the surface is in mass %, 0.70 to 1.20% and the Rockwell hardness C scale IIRC of the surface is 58.0 to 65.0, a proportion (specified oxides proportion RA) of a total area of CaO—CaS—MgO—$Al_2O_3$ composite oxides with respect to a total area of oxides in the carburized bearing is 30.0% or more.

In the present description, an oxide and a CaO—CaS—MgO—$Al_2O_3$ composite oxide are defined as follows.

Oxide: among inclusions in the carburized bearing, when the mass % of each inclusion is taken as 100%, an inclusion in which a content of oxygen is 1.0% or more in mass %

CaO—CaS—MgO—$Al_2O_3$ composite oxide among oxides, composite inclusions that contain CaO and/or CaS, MgO, and $Al_2O_3$. That is, among the oxides, one or more types selected from the group consisting of: composite inclusions containing CaO, MgO, and $Al_2O_3$ composite inclusions containing CaS, MgO, and $Al_2O_3$; and composite inclusions containing CaO, CaS, MgO and $Al_2O_3$.

The oxides are, for example, $Al_2O_3$, MgO—$Al_2O_3$ composite oxides, CaO—CaS—$Al_2O_3$ composite oxides, and CaO—CaS—MgO—$Al_2O_3$ composite oxides.

As described above, among the oxides, the particle sizes of CaO—CaS—$Al_2O_3$ composite oxides are larger than the particle sizes of other oxides. Therefore, when the proportion of CaO—CaS—$Al_2O_3$ composite oxides among the oxides is large, the rolling contact fatigue life of the carburized bearing under a hydrogen-generating environment decreases.

The particle sizes of $Al_2O_3$ and MgO—$Al_2O_3$ composite oxides are small. However, these oxides agglomerate and form clusters (agglomerates of a plurality of $Al_2O_3$ particles, agglomerates of a plurality of MgO—$Al_2O_3$ composite oxide particles). The sizes of the clusters become large. Therefore, when the amount of these oxides is large, similarly to CaO—CaS—$Al_2O_3$ composite oxides, a rolling contact fatigue life of the carburized bearing under a hydrogen-generating environment decreases.

On the other hand, the particle sizes of CaO—CaS—MgO—$Al_2O_3$ composite oxides are smaller than the particle sizes of CaO—CaS—$Al_2O_3$ composite oxides. In addition, it is difficult for CaO—CaS—MgO—$Al_2O_3$ composite oxides to become clustered in the way that $Al_2O_3$ and MgO—$Al_2O_3$ composite oxides do. Therefore, the influence of CaO—CaS—MgO—$Al_2O_3$ composite oxides on the rolling contact fatigue life of the carburized bearing under a hydrogen-generating environment is small in addition, CaO—CaS—MgO—$Al_2O_3$ composite oxides can be produced by modifying CaO—CaS—$Al_2O_3$ composite oxides.

Hence, in the carburized bearing according to the present embodiment, on the precondition that contents of elements in the chemical composition of the core portion fall within the respective ranges according to the present embodiment and satisfy Formula (1) to Formula (4), and that the concentration of C of the surface is, in mass %, 0.70 to 1.20% and the Rockwell hardness C scale HRC of the surface is 58.0 to 65.0, a proportion (specified oxides proportion RA) of a total area of CaO—CaS—MgO—$Al_2O_3$ composite oxides with respect to a total area of oxides in the steel is to be 30.0% or more. In this case, the proportion of CaO—CaS—MgO—$Al_2O_3$ composite oxides among the oxides is sufficiently high. Therefore, it is difficult for the oxides to serve as the origin of a crack. Hence, a fatigue life of a resulting carburized bearing under a hydrogen-generating environment significantly increases.

[Method for Measuring Specified Oxides Proportion RA]

The specified oxides proportion RA can, be measured by the following method. A sample is taken from a freely-selected position in the carburized bearing. For example, a sample is taken from a freely-selected position in the core portion of the carburized bearing. Among, the surfaces of the sample, a surface equivalent to the cross section (transverse section) that is perpendicular to a longitudinal direction of the carburized bearing is determined as an observation surface. The observation surface of the sample taken is mirror-polished, and 20 visual fields (evaluation area per visual field is 100 μm×100 μm) are randomly observed at a magnification of 1000× using a scanning electron microscope (SEM).

Inclusions in each visual field are identified. Each of the identified inclusions is subjected to energy dispersive X-ray spectroscopy (EDX) to identify oxides. Specifically, elementary analysis is performed at two measurement points in each inclusion using EDX. Then, in each inclusion, the respective elements (Al, Ma, Ca, S, and O) at each measurement point are detected. Taking the mass % of the inclusion that is the object of measurement as 100%, the arithmetic mean value of the content of O (mass %) obtained at the two measurement points is defined as the content of oxygen (mass %) in the inclusion.

Among the elementary analysis results of the inclusions, an inclusion having a content of O of 1.0% or more when the mass % of the inclusion is taken as 100% is identified as an "oxide".

In addition, among the oxides, in a case where Ca, Mg and Al, or Ca, S, Mg and Al are included as elements detected at the two measurement points, the oxides thereof are defined as "CaO—CaS—MgO—$Al_2O_3$ composite oxides".

The total area of oxides in the 20 visual fields is determined. In addition, the total area of CaO—CaS—MgO—$Al_2O_3$ composite oxides in the 20 visual fields is determined. The specified oxides proportion RA (%) is determined based on the following formula.

$$RA(\%)=\text{total area of CaO—CaS—MgO—}Al_2O_3\text{ composite oxides/total area of oxides}\times 100$$

The inclusions which are the target of the aforementioned identification are inclusions having an equivalent circle diameter of 0.5 μm or more. Here, the term "equivalent circle diameter" means the diameter of a circle in a case where the area of the respective inclusions is converted into a circle having the same area. If the inclusions have an equivalent circular diameter that is two times or more the beam diameter in the EDX, the accuracy of the elementary analysis is increased. In the present embodiment, the beam diameter in the EDX used for identification of inclusions is taken as 0.2 μm. In this case, inclusions having an equivalent circle diameter of less than 0.5 μm cannot increase the accuracy of the elementary analysis in the EDX. In addition, inclusions having an equivalent circle diameter of less than 0.5 μm have an extremely small influence, on die rolling contact fatigue life. Therefore, in the present embodiment, the inclusions adopted as the object of identification are inclusions having an equivalent circle diameter of 0.5 μm or more.

[Number Density of Coarse Oxides in Carburized Bearing]

In the carburized bearing, according to the present embodiment, furthermore. On the precondition that contents of elements in the chemical composition of the core portion fill within the respective ranges according to the present embodiment and satisfy Formula (1) to Formula (4) the concentration of C of the surface is, in mass %, 0.70 to 1.20%, the Rockwell hardness C scale HRC of the surface is 58.0 to 65.0, and the specified oxides proportion RA is 30.0% or more, among the oxides in the carburized bearing, the number density of oxides (coarse oxides) having an equivalent circle diameter of 20.0 μm or more is 15.0 pieces/$mm^2$ or less.

As described above, when the oxides are modified to make the specified oxides proportion RA 30.0% or more, the proportion of CaO—CaS—MgO—$Al_2O_3$ composite oxides among: the oxides is large. The particle size of CaO—CaS—MgO—$Al_2O_3$ composite oxides is small compared to CaO—CaS—$Al_2O_3$ composite oxides. In addition, is difficult lot CaO—CaS—MgO—$Al_2O_3$ composite oxides to cluster in the manner that $Al_2O_3$ and MgO—$Al_2O_3$ composite oxides do. Thus, the sizes of oxides in the carburized bearing can be kept small. Specifically, in the carburized bearing according to the present embodiment, the specified oxides proportion RA is 30.0% or more, and the number density of oxides having an equivalent circle diameter of 20.0 μm or more is 15.0 pieces/$mm^2$ or less. Therefore, a rolling contact fatigue life of the carburized bearing under a hydrogen-generating environment significantly increases.

An upper limit of the number density of the coarse oxides is preferably 14.0 pieces/$mm^2$, more preferably 13.5 pieces/$mm^2$, still more preferably 13.0 pieces/$mm^2$, even still more preferably 12.0 pieces/$mm^2$, even still more preferably 11.0 pieces/$mm^2$, and even still more preferably 10.0 pieces/$mm^2$. Note that, the lower the number density of the coarse oxides is, the more preferable it is. However, excessively decreasing the number density of coarse oxides will increase the production cost. Therefore, a lower limit of the number density of the coarse oxides is preferably 0.1 pieces/$mm^2$, more preferably 0.5 pieces/$mm^2$, and still more preferably 0.8 pieces/$mm^2$.

[Method for Measuring Number Density of Coarse Oxides in Carburized Bearing]

The number density of coarse oxides in the carburized bearing can be measured by the following method. Among the oxides identified by the method for measuring the specified oxides proportion RA described above, oxides having an equivalent circle diameter of 20.0 μm or more (coarse oxides) are identified. The number density (pieces/$mm^2$) of the coarse oxides is determined based on the total number of coarse oxides identified in the aforementioned 20 visual fields (evaluation area per visual field is 100 μm×100 μm), and the total area of the 20 visual fields. Note that, among the oxides identified in the visual fields, in a case where the shortest distance between adjacent oxides is less than 0.5 μm, a group of those oxides is regarded as being clustered, and the group of those oxides is regarded as a single oxide. The equivalent circle diameter is then determined based on the total area of the oxide group regarded as a single oxide.

In the carburized bearing according to the present embodiment having the above-described confirmation, contents of elements in the core portion of the carburized bearing fall within the respective ranges according to the present embodiment described above, and F1 to F4 satisfy Formula (1) to Formula (4). Further, the concentration of C of the surface is, in mass %, 0.70 to 1.20% and the Rockwell hardness C scale HRC of the surface is 58.0 to 65.0. In addition, the specified oxides proportion RA is 30.0% or more, and the number density of oxides having an equivalent circle diameter of 20.0 μm or more is 15.0 pieces/$mm^2$ or less. Therefore, the carburized bearing of the present embodiment has an excellent rolling contact fatigue life under a hydrogen-generating environment.

[Method for Producing Carburized Bearing]

An example of a method for producing the carburized bearing according to the present embodiment will be described. The method for producing the carburized bearing described below is an example of producing the carburized bearing according to the present embodiment Therefore, the carburized bearing having the above-described configuration may be produced by a production method other than the production method described below. However, the production method described below is a preferable example of the method for producing the carburized bearing according to the present embodiment.

First, a method for producing a steel to be a starting material of the carburized bearing (steel for a carburized bearing) according to the present embodiment will be described.

[Steel to be Starting Material of Carburized Bearing]

In a steel to be a starting material of a carburized bearing of the present embodiment, the chemical composition is the same as the chemical composition of the core portion that is described above, the specified oxides proportion RA is 30.0% or more, and the number density of oxides having an equivalent circle diameter of 20.0 μm or more is 15.0 pieces/$mm^2$ or less.

The example of the method for producing the steel having the above-described configuration includes a steelmaking process of refining molten steel and castings, the molten steel to produce a starting material (cast piece), and a hot-working process of performing hot working on the starting material to produce the steel. The processes will be each described below.

[Steelmaking Process]

In the steelmaking process, the molten steel is subjected to a well-known primary refining using a converter.

The molten steel after the primary refining is subjected to secondary refining. In the secondary refining, first, the molten steel is refined in an LF (Ladle Furnace). After the refining in the LF, refining in an RH (Ruhrstahl-Heraeus) is performed. The specified oxides, proportion RA and the number density of coarse oxides are adjusted by the relining in the LF and the RH. The refining in the LF and the RH will be described below.

[Refining in LF]

In the refining in the LF, slag containing Ca and Mg is charged into the molten steel and refining by the LF process is performed. In the LF, relining that satisfies the following conditions is performed.

Condition 1: Refining time in the LF is to be 40 minutes or more.

Condition 2: Slag basicity during the refining in the LF is to be 5.0 to 12.0,

Condition 3: When the content of Al in the molten steel after the refining in the LF is 0.005% or more and the content of Al in the steel is 0.015% or more, the content of Al in the produced steel is to be made 80.0% or less.

Condition 1 to condition 3 will be described below.

[Condition 1]

Refining time in LF: 40 minutes or more

The time from the start until the end of the refining in the LF is defined as "refining time in the LF". In the present embodiment, the refining time in the LF is to be 40 minutes or more.

The refining time in the LF influences on modification of the oxides. More specifically, the refining time in the LF influences on modification from CaO—CaS—$Al_2O_3$ composite oxides to CaO—CaS—MgO—$Al_2O_3$ composite oxides.

If the refining time in the LF is less than 40 minutes, CaO—CaS—$Al_2O_3$ composite oxides in the molten steel will not modify sufficiently into CaO—CaS—MgO—$Al_2O_3$ composite oxides. As a result, the specified oxides proportion RA in the steel will be less than 30.0%.

When the refining time in the LF is 40 minutes or more, on the precondition that the other production conditions are also satisfied, the specified oxides proportion RA will be 30.0% or more.

A lower limit of the refining time in the LF is preferably 45 minutes, and more preferably 50 minutes. Although an upper limit of the refining tune in the LF is not particularly limited, for example the upper limit is 100 minutes. Note that, it suffices that the molten steel temperature dui-Mg the refining in the LF is a well-known temperature. For example, the molten steel temperature during the refining in the LF is 1350 to 1600° C.

[Condition 2]

Basicity of slag during the refining in the LF: 5.0 to 12.0

In the refining in the LF, slag is charged into the molten steel to cause the slag to absorb inclusions. A CaO concentration/$SiO_2$ concentration in the slag is defined as the basicity. If the basicity of the slag after completion of the refining in the LF is less than 5.0, the CaO concentration in the slag in the refining in the LF is too low. In this case, in the produced steel, an excessively large amount of $Al_2O_3$ and MgO—$Al_2O_3$ composite oxides will be present among the oxides. As a result, the specified oxides proportion RA will be less than 30.0%. Further, in the produced steel, the number density of coarse oxides will be more than 15.0 pieces/mm$^2$.

On the other hand, if the basicity of the slag after completion of the refining in the LF is more than 12.0, the CaO concentration in the slag in the refining in the LF is too high. In this case, in the produced steel, an excessively large amount of CaO—CaS—$Al_2O_3$ composite oxides will be present. Therefore, the oxides will not modify sufficiently into CaO—CaS—MgO—$Al_2O_3$ composite oxides. As a result, the specified oxides proportion RA will decrease to less than 30.0%. In addition, an excessively large amount of coarse oxides will form, and the number density of coarse oxides in the produced steel will be more than 15.0 pieces/mm$^2$.

When the basicity of the slag after completion of the refining in the LF is 5.0 to 12.0, on the precondition that the other production conditions are also satisfied, oxides can be modified to produce a large amount of CaO—CaS—MgO—$Al_2O_3$ composite oxides. As a result, in the produced steel, the specified oxides proportion RA is 30.0% or more, and the number density of coarse oxides is 15.0 pieces/mm$^2$ or less.

The basicity of the slag after the refining in the LF is measured by the following method. A pan of the slag floating on the liquid surface of the molten steel after completion of the refining in the LF collected. Machined chips are generated from the collected slag, and the machined chips are collected. The collected machined chips are dissolved in acid to obtain a liquid solution. The liquid solution is subjected to ICP-AES to perform elementary analysis of the chemical composition. The content of O is determined by a well-known inert gas fusion-nondispersive infrared absorption method. Based on a content of Ca, a content of Si and a content of O obtained, the CaO concentration and the $SiO_2$ concentration in the slag are calculated in mass % by a well-known method. The basicity (=CaO concentration/$SiO_2$ concentration) is determined based on the obtained CaO concentration and $SiO_2$ concentration.

[Condition 3]

When the content of Al in the molten steel after the refining in the LF is 0.005% or more and the content of Al in the steel is 0.015% or more, the content of Al in the produced steel is to be made 80.0% or less.

The content of Al in the molten steel after the refining in the LF can be used to estimate the amount of Al that contributed to the deoxidizing action during the refining in the LF. If the content of Al in the molten steel after the refining in the LF is less than 0.005%, deoxidation of the molten steel during the refining in the LF is insufficient. In this case, a large number of coarse oxides will remain in the produced steel, Consequently, the number density of coarse oxides will be more than 15.0 piece mm$^2$.

On the other hand, in a case where the content of Al in the produced steel is 0.015% or more, if the content of Al in the molten steel after the refining in the LF is more than 80.0%, an excessively large amount of $Al_2O_3$ and MgO—$Al_2O_3$ composite oxides are formed in the molten steel. Therefore, an excessively large amount of $Al_2O_3$ and MgO—$Al_2O_3$ composite oxides remain in the produced steel. As a result, the specified oxides proportion RA is less than 30.0%. In addition, the number density of coarse oxides in the produced steel is more than 15.0 pieces/mm$^2$.

In a case where the content of Al in the molten steel after the refining in the LF is 0.005% or more and the content of Al in the steel is 0.015% or more, if the content of Al in the produced steel is 80.0% or less, an appropriate concentration of Al is contained in the molten steel during the refining in the LF. Therefore, deoxidation by Al can be performed sufficiently. In addition, on the precondition that the other production conditions are satisfied, Al oxides can be modified into CaO—CaS—MgO—$Al_2O_3$ composite oxides. As a result, in the produced steel, the specified oxides proportion RA will be 30.0% or more, and the number density of coarse oxides will be 15.0 pieces/mm$^2$ or less.

The content of Al in the molten steel after the refining in the LF is measured by the following method. A part of the molten steel after the refining in the LF is collected. The collected molten steel is cooled and solidified. Using the solidified sample (steel), elementary analysis is carried out by the same method as the "method for measuring chemical composition of steel" described above, and the content of Al is measured.

[Refining in RH]

In the refining in the RH, coarse oxides in the molten steel are caused to float up from the molten steel to remove the coarse oxides from the molten steel, to thereby prevent the sizes of oxides in the steel after the refining in the RH from being large. In the RH, refining that satisfies the following condition is performed.

Condition 4: Refining time in the RH to be set to 15 minutes or more.

Condition 4 will be described below.

[Condition 4]

Refining time in RH: 15 minutes or more

The time from the start until the end of the refining in the RH is defined as "refining time in the RH". In the present embodiment, the refining time in the RH is set to 15 minutes or more.

In the refining in the RH, coarse oxides in the molten steel are floated up and separated from the molten steel. Even when condition 1 to condition 3 of the aforementioned refining in the LF are satisfied, if the refining time in the RH is less than 15 minutes, the number density of coarse oxides having an equivalent circle diameter of 20.0 μm or more will be mare than 15.0 pieces/mm$^2$.

When the refining time in the RH is 15 minutes or more, on the precondition that the contents of the elements in the molten steel fall within the respective ranges according to the present embodiment and satisfy Formula (1) to Formula (4), and condition 1 to condition 3 in the refining in the LF are satisfied, in the steel, the specified oxides proportion RA will be 30.0% or more and the number density of coarse oxides having an equivalent circle diameter of 20.0 μm or more will be 15.0 pieces/mm$^2$ or less.

A lower limit of the refining time in the RH is preferably 20 minutes, and more preferably 25 minutes. An upper limit of the refining time in the RH is not particularly limited, and for example is 60 minutes. Note that, it suffices that the molten steel temperature during the refining in the RH is a well-known temperature. The molten steel temperature during the refining in the RH is, for example, 1350 to 1600° C.

Note that, the final component adjustment is carried out during the refining in the RH to produce molten steel in which the contents of the elements in the chemical composition fall within the respective ranges according to the present embodiment and satisfy Formula (1) to Formula (4).

By the refining method described above, molten steel in which the contents of the elements in the chemical composition fall within the respective ranges according to the present embodiment and satisfy Formula (1) to Formula (4) is produced. Using the produced molten steel, a starting material is produced by a well-known casting process. For example, using the molten steel, an ingot is produced by an ingot-making process. Alternatively, using, the molten steel, a bloom or a billet may be produced by a continuous casting process. By the above method, the starting material (bloom or ingot) is produced.

[Hot-Working Process]

In the hot-working process, the starting material (bloom or ingot) produced by the steelmaking process is subjected to hot working to be produced into the steel to be a starting material of a carburized bearing. The steel is, for example, a steel bar or a wire rod. The hot-working process includes a blooming process and a finish-rolling process. The processes will be each described below.

[Blooming Process]

In the blooming process, the starting material is subjected to hot working to be produced into a billet. Specifically, in the blooming process, the starting material is subjected to hot rolling (blooming) using a blooming mill to be produced into the billet. In a case where a continuous mill is arranged downstream of the blooming mill, the billet produced by the blooming may be further subjected to hot rolling using the continuous mill to be produced into a billet having a smaller size.

The heating temperature and a retention time in a reheating furnace in the blooming process are not particularly limited. The heating temperature in the blooming process is, for example, 1150 to 1300° C. The retention time at the heating temperature is, for example, 15 to 30 hours.

[Finish-Rolling Process]

In the finish-rolling process, first, the billet is heated with a reheating furnace. The heated billet is subjected to hot rolling using a continuous mill to be produced into a steel bar or a wire rod being the steel to be a starting material of a carburized bearing. A beating temperature and a retention time in the reheating furnace in the finish-rolling process are not particularly limited. The heating temperature in the finish-rolling process is, for example, 1150 to 1300° C. The retention time at the heating temperature is, for example, 1.5 to 10 hours.

The steel subjected to the finish rolling is cooled at a cooling rate not more than that of allowing cooling to be produced into the steel to be a starting material of a carburized bearing. The cooling rate is not particularly limited. Preferably, an average cooling rate CR for a temperature range in which a temperature of the steel subjected to the finish rolling is 800° C. to 500° C. is set at 0.1 to 5.0° C. sec. When the temperature of the steel is 800 to 500° C., phase transformation from austenite into ferrite, pearlite, or bainite occurs. When the average cooling rate CR for the temperature range in which the temperature of the steel is 800° C. to 500° C. is 0.1 to 5.0° C./sec, the microstructure becomes a structure in which a total area fraction of ferrite and pearlite is 5.0% or more, and the balance is bainite.

The average cooling rate CR is measured by the following method. The steel subjected to the finish rolling is conveyed downstream on a conveyance line. On the conveyance line, a plurality of thermometers are arranged along the conveyance line. Thus, the temperature of the steel can be measured at the respective positions of the conveyance line. Based on results of measurement by the plurality of thermometers arranged along the conveyance line, a time taken by the temperature of the steel to decrease from 800° C. to 500° C. is determined, and then the average cooling rate CR (° C./sec) is determined. The average cooling rate CR can be adjusted by, for example, arranging a plurality of slow cooling covers spaced from one another on the conveyance line.

Through the above production process, a steel to be a starting material of a carburized bearing according to the present embodiment having the above-described configuration can be produced.

[Process for Producing Carburized Bearing]

A carburized bearing is produced by the following production process from the above-described steel as a starting material. First, the above-described steel to be a starting material of the carburized bearing is worked into a predetermined shape to be produced into an intermediate product. A method for the working is, for example, hot forging or machining. The machining is, for example, cutting machining, it suffices to perform the hot forging under well-known conditions. In a hot-forging process, a heating temperature is, for example, 1000 to 1300° C. The intermediate product subjected to the hot forging is allowed to cool. After the hot forging, a machining may be performed. The steel or the intermediate product before subjected to the machining may be subjected to well-known spheroidizing annealing.

The produced intermediate product is subjected to a well-known carburizing to be produced into the carburized bearing. The carburizing includes carburizing-quenching, and tempering, as described above. In the carburizing-quenching, the intermediate product is heated to, and retained at not less than an $A_{c3}$ transformation point in an atmosphere containing a well-known converted carburizing gas, and then subjected to rapid cooling. In the tempering treatment, the intermediate product subjected to the carburizing-quenching is retained within a temperature range of 150 to 200° C. for a predetermined time. Here, the converted carburizing gas means a well-known endothermic converted gas (RX gas). The RX gas is a gas made by mixing a hydrocarbon gas such as butane and propane with air and passing them through a heated Ni catalyst to cause them to react with each other, the RX gas is a gaseous mixture containing CO, $H_2$, $N_2$, and the like.

It is technical matter well known by those skilled in the art that a surface concentration of C, and a surface hardness of the carburized bearing of the present embodiment can be adjusted by controlling conditions for the carburizing-quenching and the tempering.

Specifically, the surface concentration of C of the carburized bearing is adjusted mainly by the carbon potential of the carburizing-quenching, the carburizing temperature, and the retention time at the carburizing temperature. The surface concentration of C is increased with an increase in the carbon potential, an increase in the carburizing temperature, and an increase in the retention time at the carburizing temperature. In contrast, the surface concentration of C is decreased with a decrease in the carbon potential, a decrease in the carburizing temperature, and a decrease in the retention time at the carburizing temperature. Surface hardness relates to the surface concentration of C. Specifically, the surface hardness is increased with increases in the surface concentration of C. On the other hand, the surface hardness is decreased with decreases in the surface concentration of C. A surface hardness increased by the carburizing-quenching can be decreased by tempering. A surface hardness is decreased by increasing the tempering temperature and lengthening the retention time at the tempering temperature. A surface hardness can be kept high by decreasing the tempering temperature and shortening the retention time at the tempering temperature. Therefore, in a case of performing well-known carburizing on an intermediate product M which contents of elements m the chemical composition fall within the respective ranges according to the present embodiment and satisfy Formula (1) to Formula (4), by adjusting the aforementioned conditions, the concentration of C of the surface of the carburized bearing can be made, in mass %, 0.70 to 1.20%, and the Rockwell hardness C scale HRC of the surface can be made 58.0 to 65.0.

Preferable conditions for the carburizing-quenching are as follows.

Carbon potential CP in atmosphere: 0.70 to 1.40

When a carbon potential CP in the atmosphere is 0.70 or more, the concentration of C of the surface of the carburized bearing is sufficiently increased; for example, the surface concentration of C is increased to, in mass %, 0.70% or more. In this case, carbides or carbo-nitrides are produced in a sufficient amount by the carburizing, significantly increasing wear resistance. In addition, when the carbon potential CP is 1.40 or less, the surface concentration of C becomes 1.20% or less, and production of coarse carbides or carbo-nitrides is sufficiently prevented or reduced. Therefore, a preferable carbon potential CP is to be 0.70 to 1.40.

Retention temperature in carburizing (carburizing temperature): 830 to 930° C.

Retention time at carburizing temperature: 30 to 100 minutes

If the carburizing temperature is excessively low, diffusion velocity of C becomes low. In this case, as treatment time necessary to obtain predetermined heat treatment properties, is lengthened, increasing a production cost. On the other hand, if the carburizing temperature is excessively high, solubility of C penetrating into a matrix of the steel is increased. As a result, carbides or carbo-nitrides are not produced in a sufficient amount, decreasing a wear resistance of the carburized bearing. Thus, the carburizing temperature is to be 830 to 930° C.

The retention time at the carburizing temperature is not limited to a specific time as long as a sufficient concentration of C is kept at the surface of the steel. The retention time is, for example, 30 to 100 minutes.

Quenching temperature: 830 to 930° C.

An excessively low quenching temperature fails to dissolve C sufficiently in steel, decreasing a hardness of the steel. On the other hand, an excessively high quenching temperature causes grains to coarsen, making coarse carbides or carbo-nitrides liable to precipitate along grain boundaries. Thus, the quenching temperature is to be 830 to 930° C. Note that, the carburizing temperature may also be used as the quenching temperature. Note that, the cooling method during quenching may be water cooling or may be oil cooling.

Preferable conditions for the tempering are, for example, as follows.

Tempering temperature 150 to 200° C.

Retention time at tempering temperature: 30 to 240 minutes

An excessively low tempering temperature fads to provide a sufficient toughness of the core portion of the carburized bearing. On the other hand, an excessively high tempering temperature decreases a surface hardness of the carburized bearing, decreasing a wear resistance of the carburized bearing. Thus, the tempering temperature is to be 150 to 200° C.

An excessively short retention time at the tempering temperature fails to provide a sufficient toughness or the core portion. On the other hand, an excessively long retention tittle decreases surface hardness, decreasing a wear resistance of the carburized bearing. Therefore, the retention time at the tempering temperature is 30 to 240 minutes.

Through the above production process, a carburized bearing is produced. In the carburized bearing according to the present embodiment, an excellent rolling contact fatigue life is obtained under a hydrogen-generating environment.

EXAMPLE

Advantageous effects of the carburized bearing according to the present embodiment will now be described more specifically with EXAMPLE. The conditions adopted M the following EXAMPLE are one example of conditions adopted for confirming the workability and advantageous effects of the carburized bearing according to the present embodiment. Accordingly, the carburized hearing according to the present embodiment is not limited to this one example of conditions.

Molten steels having various chemical compositions shown in Table 1 were produced.

TABLE 1

| Steel type | C | Si | Mn | P | S | Cr | Mo | V | Al | N | O |
|---|---|---|---|---|---|---|---|---|---|---|---|
| | Chemical composition (in mass %, Balance being Fe and impurities) | | | | | | | | | | |
| A | 0.32 | 0.11 | 0.45 | 0.009 | 0.003 | 1.14 | 0.23 | 0.24 | 0.024 | 0.0070 | 0.0013 |
| B | 0.37 | 0.32 | 0.45 | 0.008 | 0.002 | 1.26 | 0.19 | 0.25 | 0.029 | 0.0060 | 0.0009 |
| C | 0.42 | 0.28 | 0.61 | 0.005 | 0.001 | 1.22 | 0.24 | 0.31 | 0.030 | 0.0050 | 0.0006 |
| D | 0.44 | 0.10 | 0.46 | 0.007 | 0.004 | 0.95 | 0.22 | 0.29 | 0.031 | 0.0060 | 0.0009 |
| E | 0.30 | 0.28 | 0.48 | 0.011 | 0.005 | 1.24 | 0.21 | 0.34 | 0.027 | 0.0050 | 0.0011 |
| F | 0.38 | 0.33 | 0.62 | 0.004 | 0.003 | 1.31 | 0.28 | 0.29 | 0.022 | 0.0070 | 0.0007 |
| G | 0.39 | 0.31 | 0.61 | 0.006 | 0.003 | 1.27 | 0.24 | 0.28 | 0.024 | 0.0080 | 0.0006 |
| H | 0.42 | 0.15 | 0.49 | 0.004 | 0.004 | 0.81 | 0.23 | 0.38 | 0.025 | 0.0060 | 0.0004 |
| I | 0.30 | 0.20 | 0.41 | 0.004 | 0.003 | 0.81 | 0.18 | 0.24 | 0.031 | 0.0120 | 0.0006 |
| J | 0.31 | 0.42 | 0.58 | 0.013 | 0.004 | 1.49 | 0.29 | 0.39 | 0.020 | 0.0080 | 0.0005 |
| K | 0.25 | 0.11 | 0.40 | 0.004 | 0.003 | 0.80 | 0.18 | 0.25 | 0.022 | 0.0090 | 0.0006 |
| L | 0.44 | 0.42 | 0.67 | 0.008 | 0.005 | 1.35 | 0.28 | 0.38 | 0.016 | 0.0070 | 0.0011 |
| M | 0.39 | 0.30 | 0.61 | 0.004 | 0.002 | 1.23 | 0.18 | 0.33 | 0.027 | 0.0060 | 0.0009 |
| N | 0.41 | 0.35 | 0.60 | 0.006 | 0.003 | 1.21 | 0.21 | 0.39 | 0.025 | 0.0040 | 0.0010 |
| O | 0.37 | 0.40 | 0.61 | 0.014 | 0.003 | 1.19 | 0.24 | 0.27 | 0.023 | 0.0110 | 0.0005 |
| P | 0.29 | 0.31 | 0.66 | 0.013 | 0.004 | 1.21 | 0.23 | 0.30 | 0.029 | 0.0090 | 0.0008 |
| Z | 1.02 | 0.20 | 0.41 | 0.012 | 0.006 | 1.41 | 0.03 | | 0.015 | 0.0050 | 0.0011 |

| Steel type | Cu | Ni | B | Nb | Ti | F1 | F2 | F3 | F4 |
|---|---|---|---|---|---|---|---|---|---|
| | Chemical composition (in mass %, Balance being Fe and impurities) | | | | | | | | |
| A | | | | | | 1.63 | 2.74 | 0.96 | 2.56 |
| B | | | | | | 1.71 | 3.03 | 0.76 | 2.79 |
| C | | | | | | 1.98 | 3.38 | 0.77 | 2.49 |
| D | 0.11 | | | | | 1.77 | 2.96 | 0.76 | 2.43 |
| E | | 0.13 | | | | 2.11 | 3.00 | 0.62 | 2.56 |
| F | | | 0.0018 | | | 1.94 | 3.40 | 0.97 | 2.69 |
| G | | | | 0.030 | | 1.86 | 3.32 | 0.86 | 2.45 |
| H | | | | | 0.040 | 2.13 | 2.94 | 0.61 | 2.49 |
| I | | | | | | 1.48 | 2.37 | 0.75 | 2.51 |
| J | | | | | | 2.47 | 3.46 | 0.74 | 2.58 |
| K | | | | | | 1.52 | 2.19 | 0.72 | 2.56 |
| L | | | | | | 2.36 | 3.77 | 0.74 | 2.42 |
| M | | | | | | 2.05 | 3.28 | 0.55 | 2.52 |
| N | | | | | | 2.32 | 3.42 | 0.54 | 2.51 |
| O | | | | | | 1.79 | 3.23 | 0.89 | 1.91 |
| P | | | | | | 1.93 | 3.07 | 0.77 | 1.89 |
| Z | | | | | | | | | |

Blank fields seen in Table 1 each indicate that a content of a corresponding element fell below a detection limit of the element. A steel type Z included a chemical composition equivalent to that of SUJ2, a conventional steel specified in JIS G 4805(2008). In this EXAMPLE, the steel type Z will be referred to as a "reference steel for comparison".

When producing the molten steels, first, primary refining was performed using a converter. After the primary refining, the molten steel of each test number was subjected to refining in the LF.

Condition 1 to condition 3 in the refining in the LF were as shown in Table 2. Specifically, the refining time in the LF (mins) for each test number was, as shown in the column "refining time in LF" of the column "LF" in Table 2. The basicity of the slag, after completion of the refining in the LF was as shown in the column "basicity after LF" of the column "LF" in Table 2. The basicity of the slag after completion of the refining in the LF was measured by the method described above. The content of Al in the molten steel after the refining in the LF was as shown in the column "content of Al after LF" of the column "LF" in Table 2. The content of Al in the molten steel after the refining in the LF was measured by the method described above. Note that, the molten steel temperature during the refining in the LF was within the range of 1400 to 1600° C.

Each molten steel after the refining in the LF was subjected to refining in the RH. Condition 4 in the refining in the RH was as follows. Specifically, the refining time in the RH (mins) for each test number was as shown in the column "refining time in RH" of the column "RH" in Table 2. Note that, the molten steel temperature during the refining in the RH was within the range of 1400 to 1600° C. Through the above treatments, molten steels having chemical compositions shown in Table 1 were produced. The produced molten steels were subjected to continuous casting to be produced into blooms.

TABLE 2

| Test No. | Steel type | F1 | F2 | F3 | F4 | LF Condition 1 Refining time in LF (min) | LF Condition 2 Basicity after LF | LF Condition 3 Content of Al after LF (mass %) | LF Condition 3 Content of Al of steel × 80.0% | RH Condition 4 Refining time in RH (min) | Machinability Service life ratio |
|---|---|---|---|---|---|---|---|---|---|---|---|
| 1 | A | 1.63 | 2.74 | 0.96 | 2.56 | 45 | 8.2 | 0.012 | 0.019 | 20 | 1.1 |
| 2 | B | 1.71 | 3.03 | 0.76 | 2.79 | 40 | 7.9 | 0.011 | 0.023 | 20 | 1.0 |
| 3 | C | 1.98 | 3.38 | 0.77 | 2.49 | 45 | 8.1 | 0.015 | 0.024 | 25 | 1.0 |
| 4 | D | 1.77 | 2.96 | 0.76 | 2.43 | 45 | 7.7 | 0.014 | 0.025 | 30 | 0.9 |
| 5 | E | 2.11 | 3.00 | 0.62 | 2.56 | 40 | 7.8 | 0.011 | 0.022 | 30 | 1.1 |
| 6 | F | 1.94 | 3.40 | 0.97 | 2.69 | 50 | 8.3 | 0.014 | 0.018 | 30 | 1.0 |
| 7 | G | 1.86 | 3.32 | 0.86 | 2.45 | 55 | 8.3 | 0.013 | 0.019 | 35 | 0.9 |
| 8 | H | 2.13 | 2.94 | 0.61 | 2.49 | 50 | 7.9 | 0.017 | 0.020 | 15 | 1.2 |
| 9 | B | 1.65 | 2.98 | 0.75 | 2.59 | 50 | 9.1 | 0.018 | 0.023 | 30 | 1.2 |
| 10 | A | 1.67 | 2.77 | 0.84 | 2.53 | 45 | 7.2 | 0.014 | 0.019 | 25 | 0.9 |
| 11 | I | 1.48 | 2.37 | 0.75 | 2.51 | 45 | 8.1 | 0.015 | 0.025 | 25 | 1.5 |
| 12 | J | 2.47 | 3.46 | 0.74 | 2.58 | 55 | 8.0 | 0.013 | 0.016 | 30 | 0.9 |
| 13 | K | 1.52 | 2.19 | 0.72 | 2.56 | 60 | 7.9 | 0.014 | 0.018 | 20 | 1.4 |
| 14 | L | 2.36 | 3.77 | 0.74 | 2.42 | 45 | 7.7 | 0.011 | 0.013 | 20 | 0.4 |
| 15 | M | 2.05 | 3.28 | 0.55 | 2.52 | 40 | 8.1 | 0.016 | 0.022 | 25 | 1.0 |
| 16 | N | 2.32 | 3.42 | 0.54 | 2.51 | 40 | 8.3 | 0.016 | 0.020 | 25 | 0.9 |
| 17 | O | 1.79 | 3.23 | 0.89 | 1.91 | 50 | 9.0 | 0.011 | 0.018 | 20 | 1.2 |
| 18 | P | 1.93 | 3.07 | 0.77 | 1.89 | 45 | 7.2 | 0.012 | 0.023 | 25 | 1.1 |
| 19 | A | 1.63 | 2.74 | 0.96 | 2.56 | 15 | 7.8 | 0.013 | 0.019 | 20 | 1.1 |
| 20 | B | 1.71 | 3.03 | 0.76 | 2.79 | 20 | 8.1 | 0.015 | 0.023 | 40 | 1.3 |
| 21 | A | 1.63 | 2.74 | 0.96 | 2.56 | 50 | 8.3 | 0.014 | 0.019 | 10 | 1.1 |
| 22 | B | 1.71 | 3.03 | 0.76 | 2.79 | 45 | 8.1 | 0.016 | 0.023 | 10 | 1.2 |
| 23 | A | 1.67 | 2.77 | 0.84 | 2.53 | 50 | 4.9 | 0.015 | 0.019 | 30 | 1.1 |
| 24 | B | 1.65 | 2.98 | 0.75 | 2.59 | 45 | 12.1 | 0.014 | 0.023 | 25 | 1.0 |
| 25 | A | 1.67 | 2.77 | 0.84 | 2.53 | 40 | 8.9 | 0.025 | 0.019 | 20 | 0.9 |

| Test No. | carburized bearing Concentration of C (%) | HRC | Core portion microstructure | RA (%) | Coarse oxides member density (pieces/mm$^2$) | Rolling contact fatigue life ratio | Remarks |
|---|---|---|---|---|---|---|---|
| 1 | 0.82 | 61.0 | M | 35.0 | 2.6 | 3.1 | Inventive Example |
| 2 | 0.81 | 60.0 | M | 40.0 | 7.5 | 2.1 | Inventive Example |
| 3 | 0.81 | 60.0 | M | 41.0 | 2.1 | 3.8 | Inventive Example |
| 4 | 0.80 | 60.0 | M | 38.0 | 2.0 | 4.2 | Inventive Example |
| 5 | 0.80 | 60.0 | M | 36.0 | 8.0 | 2.2 | Inventive Example |
| 6 | 0.80 | 60.0 | M | 46.0 | 1.8 | 4.3 | Inventive Example |
| 7 | 0.81 | 61.0 | M | 50.0 | 1.0 | 5.1 | Inventive Example |
| 8 | 0.82 | 62.0 | M | 46.0 | 5.5 | 3.0 | Inventive Example |
| 9 | 0.71 | 59.0 | M | 39.0 | 6.4 | 2.2 | Inventive Example |
| 10 | 1.19 | 64.0 | M | 42.0 | 3.0 | 2.1 | Inventive Example |
| 11 | 0.80 | 60.0 | M | 40.0 | 6.8 | 1.1 | Comparative Example |
| 12 | 0.81 | 61.0 | M | 50.0 | 2.5 | 1.5 | Comparative Example |
| 13 | 0.81 | 60.0 | M | 45.0 | 4.2 | 1.4 | Comparative Example |
| 14 | 0.80 | 60.0 | M | 32.0 | 10.9 | 2.2 | Comparative Example |
| 15 | 0.80 | 60.0 | M | 40.0 | 5.9 | 1.1 | Comparative Example |
| 16 | 0.79 | 90.0 | M | 39.0 | 7.3 | 1.9 | Comparative Example |
| 17 | 0.80 | 60.0 | M | 41.0 | 5.2 | 1.5 | Comparative Example |
| 18 | 0.81 | 61.0 | M | 45.0 | 4.3 | 1.4 | Comparative Example |
| 19 | 0.78 | 59.0 | M | 19.0 | 24.2 | 0.9 | Comparative Example |
| 20 | 0.81 | 61.0 | M | 22.0 | 19.8 | 0.5 | Comparative Example |
| 21 | 0.80 | 60.0 | M | 44.0 | 20.1 | 0.7 | Comparative Example |
| 22 | 0.81 | 61.0 | M | 39.0 | 18.9 | 0.8 | Comparative Example |
| 23 | 0.79 | 59.0 | M | 27.0 | 17.6 | 1.8 | Comparative Example |
| 24 | 0.81 | 60.0 | M | 29.0 | 18.1 | 1.6 | Comparative Example |
| 25 | 0.82 | 62.0 | M | 28.0 | 19.8 | 1.9 | Comparative Example |

Each bloom was subjected to hot working to produce a steel (steel bar) to be a starting material of a carburized hearing. Specifically, first, the bloom was subjected to a blooming process. The heating temperature of the bloom in the blooming process was in the range of 1200 to 1300° C. The heating time was 18 hours. The heated blooms were subjected to blooming to be produced into billets each having a rectangular transverse section of 160 mm×160 mm.

In addition, the billets were subjected to the finish-rolling process. In the finish-rolling process, the billets were heated for 2.0 hours at 1200 to 1300° C. The heated billets were subjected to hot rolling to be produced into steel bars having a diameter of 60 mm. The produced billets were cooled. An average cooling rate CR in a temperature range in which the temperature of the steel cooled from 800° C. to 500° C. was 0.1 to 5.0° C./sec. Through the above processes, steel bars (steels) to be starting materials of carburized bearings were produced. Note that, from the reference steel for comparison (steel type Z), a steel bar having a diameter of 60 mm was produced under the same production conditions.

Evaluation Tests

[Microstructure Observation Test of Steel]

A simple was taken from an R/2 position of a cross section of a steel (steel bar) being a starting material of a carburized bearing of each test number that was perpendicular to a longitudinal direction (axial direction) of the steel (transverse section). Of surfaces of the sample taken, a surface equivalent to the transverse section was determined as an observation surface. The observation surface was subjected to mirror polish and then etched with 2% nitric acid-alcohol (Nital etchant). The etched observation surface was observed under an optical microscope with 500× magnification, and photographic images of freely-selected 20 visual fields on the etched observation surface were created. A size of each of the visual fields was set at 100 μm×100 μm.

In each visual field, phases (ferrite, pearlite, hard phase and the like) were identified. Here, the hard phase was taken as a phase composed of one or more types selected from the group consisting of bainite and martensite. Of the identified phases, a total area of ferrite ($\mu m^2$) and a total area of pearlite ($\mu m^2$) were determined in each visual field. A proportion of a summed area of total areas of ferrite and total areas of pearlite in all the visual fields to a total area of all the visual fields was defined as a total area fraction (%) of ferrite and pearlite. The total area fraction (%) of ferrite and pearlite was determined as a value obtained by rounding off the total area fraction (%) of ferrite and pearlite to the second decimal place. In addition, a value calculated by deducting the total area fraction of ferrite and pearlite from 100.0% was adopted as the total area fraction (%) of the hard phase. The results of the measurement showed that in the microstructure of the steel of every test number except Test No. 14, a total area fraction of ferrite and pearlite was 5.0 to 100.0% and a total area fraction of the hard phase was 0 to 95.0%. In the microstructure of the steel of Test No. 14, the total area fraction of ferrite and pearlite was less than 5.0% and the balance was the hard phase.

[Machinability Evaluation Test]

Straight turning was performed on the steel bar having a diameter of 60 mm, which is the steel of each test number, to evaluate its service life. Specifically, the straight turning was performed on the steel bar of each test number under the following conditions. A cutting tool used was made of a hard metal equivalent to P10 specified in JIS B 4053(2013). A cutting speed was set at 150 m/min, a feed rate was set at 0.15 mm/rev, and a depth of cut was set at 1.0 mm. Note that no lubricant was used in the turning.

The straight turning was performed under the above-described cutting conditions, and a lime taken for a flank wear width of a cutting tool to be 0.2 mm was defined as service life (Hr). A service life of the reference steel liar comparison (steel type Z) was used as a reference, and a service life ratio of each test number was determined by the following formula.

Service life ratio=Service life (Hr) of each test number/Service life (Hr) of reference steel for comparison (steel type Z)

When an obtained service life ratio was 0.8 or more, the steel was determined to be excellent in machinability. In contrast, when the service life ratio was less than 0.8, the steel was determined to be low in machinability. The evaluation results are shown in Table 2.

[Production of Carburized Bearing]

Carburized bearings were produced by the following production method. From the steel (steel bar having a diameter of 60 mm) of each test number, a disk-shaped intermediate product having a diameter of 60 mm and a thickness of 5.5 mm was fabricated by machining. A thickness of the intermediate product (5.5 mm) was equivalent to a longitudinal direction of the steel bar. The intermediate product was subjected to carburizing (carburizing-quenching, and tempering) to be produced into the carburized bearing. At this point, the carburizing-quenching and the tempering were performed such that the each carburized bearing had a surface concentration of C of 0.70 to 1.20%, and a surface Rockwell hardness C scale HRC of 58.0 to 65.0. Specifically, the carburizing-quenching treatment was performed with carbon potentials CP, heating temperatures (in this EXAMPLE, Heating temperature=Carburizing temperature=Quenching temperature), and retention times (=Retention time at Carburizing temperature+Retention time at Quenching temperature) shown in Table 3, and oil quenching using oil at 80° C. was used as the cooling method. The tempering treatment was performed at tempering temperatures and for retention times shown in Table 3, and after a lapse of each retention time, air cooling was performed. Through the above processes, a plurality of carburized bearings (rolling contact fatigue test specimens) were fabricated for each test number.

TABLE 3

| | | Carburizing-quenching | | | Tempering | |
|---|---|---|---|---|---|---|
| Test No. | Steel type | CP | Heating temperature (° C.) | Retention time (min) | Tempering temperature (° C.) | Retention time (min) |
| 1 | A | 0.88 | 900 | 60 | 180 | 120 |
| 2 | B | 1.00 | 910 | 60 | 180 | 120 |
| 3 | C | 1.00 | 890 | 60 | 180 | 120 |
| 4 | D | 0.90 | 900 | 60 | 180 | 120 |
| 5 | E | 1.10 | 910 | 60 | 180 | 120 |
| 6 | F | 1.00 | 900 | 60 | 180 | 120 |
| 7 | G | 1.10 | 910 | 60 | 180 | 120 |
| 8 | H | 1.00 | 900 | 60 | 180 | 120 |
| 9 | B | 0.75 | 900 | 60 | 180 | 120 |
| 10 | A | 1.35 | 910 | 60 | 180 | 120 |
| 11 | I | 1.20 | 890 | 60 | 180 | 120 |
| 12 | J | 0.95 | 910 | 60 | 180 | 120 |
| 13 | K | 1.10 | 890 | 60 | 180 | 120 |
| 14 | L | 1.00 | 900 | 60 | 180 | 120 |
| 15 | M | 1.00 | 910 | 60 | 180 | 120 |
| 16 | N | 0.90 | 900 | 60 | 180 | 120 |
| 17 | O | 1.00 | 900 | 60 | 180 | 120 |
| 18 | P | 1.10 | 890 | 60 | 180 | 120 |
| 19 | A | 1.00 | 910 | 60 | 180 | 120 |
| 20 | B | 1.10 | 900 | 60 | 180 | 120 |
| 21 | A | 1.00 | 910 | 60 | 180 | 120 |
| 22 | B | 1.00 | 900 | 60 | 180 | 120 |
| 23 | A | 0.88 | 900 | 60 | 180 | 120 |
| 24 | B | 1.00 | 910 | 60 | 180 | 120 |
| 25 | A | 0.88 | 900 | 60 | 180 | 120 |

[Analytical Test of Chemical Composition of Core Portion]

For each test number, a drill was used to generate machined chips from the core portion of the carburized bearing, and the machined chips were collected. The collected machined chips were dissolved in acid and a liquid solution was obtained. The liquid solution was subjected to ICP-AES to perform elementary analysis of the chemical composition. The content of C and the content of S were determined by a well-known high-frequency combustion method (combustion-infrared absorption method). The content of N was determined using a well-known inert gas fusion-thermal conductivity method. The content of O was determined using a well-known inert gas fusion-nondispersive infrared absorption method. As a result, the chemical compositions of the core portions of the carburized bearings of the respective test numbers were as shown in Table 1.

Test for Measuring Martensite Area Fraction in Core Portion)

The area fraction of martensite in the core portion of each carburized bearing was determined by the following method. A sample was taken from the core portion of the carburized bearing. The surface of the sample was etched with a picral. In the surface after etching, three freely-selected visual fields were observed in a secondary electron image using an SEM. The area of each visual field was set to 400 $\mu m^2$ (magnification of 5000×). In the SEM observation, martensite was identified, and the total area of martensite in the three visual fields was determined. A proportion of the determined total area of martensite with respect to the total area of the three visual fields was defined as the area fraction (%) of martensite. The character "M" in the column "Core portion microstructure" in Table 2 means that the martensite area fraction was 90.0% or more.

[Test for Measuring Specified Oxides Proportion RA]

The specified oxides proportion RA of the carburized bearing of each test number was measured by the following method. A sample was taken from a freely-selected position of the core portion in a cross section (transverse section) perpendicular to a longitudinal direction of the carburized bearing. Among the surfaces of the sample, a surface equivalent to the cross section (transverse section) perpendicular to the longitudinal direction of the carburized beating was determined, as an observation surface. The observation surface of the sample taken was mirror-polished, and 20 visual fields (evaluation area per visual field was 100 μm×100 μm) were randomly observed at a magnification of 1000× using a scanning electron microscope (SEM).

Inclusions in each visual field were identified. Each of the identified inclusions was subjected to EDX to identify oxides. Specifically, elementary analysis was performed at least at two measurement points in each inclusion using. EDX. Then, in each inclusion, the respective elements (Al, Mg, Ca, S, and O) at each measurement point were detected. The arithmetic mean value of the content of O obtained at the two measurement points of each inclusion was defined as the content of oxygen (mass %) in the inclusion.

Among the elementary analysis results of the identified inclusions, an inclusion having a measured content of O of 1.0% or more was defined as an "oxide". In addition, among the identified oxides, when Ca, Mg and Al, or Ca, S, Mg and Al were included as elements detected at the two measurement points, the oxides thereof were defined as "CaO—CaS—MgO—$Al_2O_3$ composite oxides".

The total area of oxides in the 20 visual fields was determined. In addition, the total area of CaO—CaS—MgO—$Al_2O_3$ composite oxides in the 20 visual fields was determined. The specified oxides proportion RA (%) was determined based on the following formula.

$$RA\ (\%) = \text{total area of CaO—CaS—MgO—}Al_2O_3\text{ composite oxides/total area of oxides}\times 100$$

Obtained specified oxides proportions RA (%) are shown in the column "RA (%)" in Table 2.

[Test for Measuring Number Density of Coarse Oxides in Carburized Bearing]

The number density of coarse oxides in the carburized bearing of each test number was measured by the following method using the 20 visual fields identified in the of specified oxides proportion RA measurement test. The equivalent circle diameter of each oxide identified in the 20 visual fields was calculated. Among all the oxides in the 20 visual fields, the number density (pieces/$mm^2$) of oxides having an equivalent circle diameter of 20.0 μm or more was determined based on the total number of oxides having an equivalent circle diameter of 20.0 μm or more and the total area of the 20 visual fields. Note that, among the oxides identified in the visual fields, in a case where the shortest distance between adjacent oxides was less than 0.5 μm, a group of those oxides was regarded as being clustered, and the group of those oxides was regarded as a single oxide. The equivalent circle diameter was then determined based on the total area of the oxide group regarded as a single oxide. Obtained number densities are shown in the column "coarse oxides number density (pieces/$mm^2$)" in Table 2.

[Surface Concentration of C Measurement Test and Surface Rockwell Hardness C Scale Test]

A test to measure the surface concentration of C and a surface Rockwell hardness scale test were performed using one of the rolling contact fatigue test specimens of each test number. Specifically, an electron probe micro analyzer (ERMA) was used to measure a concentration of C (mass %) at a freely-selected surface position of the carburized bearing, from the surface down to a depth of 100 μm with a 1.0-μm pitch. An arithmetic mean value of the measured concentrations of C was defined as the surface concentration of C (mass %). Obtained surface concentrations of C are shown in the column "concentration of C (%)" in the column "rolling contact fatigue life" in Table 2.

In addition, the Rockwell hardness C scale HRC of the rolling contact fatigue test specimens was measured by the following method. On a surface of each rolling contact fatigue test specimen, four freely-selected measurement positions were specified. At the four specified measurement positions, the Rockwell hardness C scale test using C scale was conducted in conformity to JIS Z 2245(2011). An arithmetic mean value of four obtained. Rockwell hardness C scale HRC values was defined as the Rockwell hardness C scale HRC of the surface. Obtained surface Rockwell hardness C scale values are shown in the column "HRC" in Table 2.

[Rolling Contact Fatigue Life Test Under Hydrogen-Generating Environment]

A surface of a specimen of each test number was subjected to lapping to prepare a rolling contact fatigue test specimen. Further, in the rolling contact fatigue life test under a hydrogen environment, the steel type Z being the reference steel for comparison was subjected to, in place of the above-described carburizing, the following quenching treatment and tempering treatment. Specifically, from a steel bar of the reference steel for comparison (steel type Z) having a diameter of 60 mm, a disk-shaped intermediate product having a diameter of 60 rum and a thickness of 5.5 mm was fabricated by machining. A thickness of the intermediate product (5.5 mm) was equivalent to a longitudinal direction of the steel bar. The intermediate product was subjected to quenching treatment. In the quenching treatment, its quenching temperature was set at 860° C., and its retention time at the quenching temperature was set at 60 minutes. After a lapse of the retention time, the intermediate product was subjected to oil quenching using oil at 80° C. Note that a furnace atmosphere in a heat treatment furnace used for the quenching treatment was formulated so that decarburization would not occur in the intermediate product subjected to the quenching treatment. The intermediate product subjected to the quenching treatment was subjected to the tempering treatment. In the tempering treatment, its tempering temperature was set at 180° C., and its retention time at the tempering temperature was set at 120 minutes. A surface of the obtained specimen was subjected to lapping to be produced into a rolling contact fatigue test specimen of the reference steel for comparison (steel type Z).

Using the rolling contact fatigue test specimen (carburized bearing) of each test number and the rolling contact fatigue test specimen of the reference steel for comparison (steel type Z), the following rolling contact fatigue life test was conducted. Specifically, to simulate a hydrogen-generating environment, the rolling contact fatigue test specimen was immersed in 20% ammonium thiocyanate ($NH_4SCN$) aqueous solution and subjected to hydrogen charging. Specifically, the hydrogen charging was performed with a temperature of the aqueous solution set at 50° C. and a time of the immersion set at 24 hours.

The rolling contact fatigue test specimen subjected to the hydrogen charging was subjected to the rolling contact fatigue test using a thrust rolling contact fatigue tester. In the test, a maximum contact interfacial pressure was set at 3.0 GPa, and a cycle rate of 1800 cpm (cycles per minute). A lubricant used for the test was turbine oil, and a steel ball used for the test was a thermally-refined material made of SUJ2 specified in JIS G 4805(2008).

A result of the rolling contact fatigue test was plotted on Weibull probability paper, and an L10 life, which shows a 10% fracture probability, was defined as "rolling contact fatigue life". A ratio of a rolling contact fatigue life L10 of each test number to a rolling contact fatigue life L10 of the reference steel for comparison (steel type Z) was defined as rolling contact fatigue life ratio. In other words, the rolling contact fatigue life ratio was determined by the following formula:

Rolling contact fatigue life ratio Rolling contact fatigue life of each test number/Rolling contact fatigue life of reference steel for comparison (steel type Z)

Obtained rolling contact fatigue life ratios are shown in the column "Rolling contact fatigue life ratio" in Table 2. When the obtained rolling, contact fatigue life ratio was 2.0 or more, the carbonitrided bearing was determined to be excellent in rolling contact fatigue life under a hydrogen-generating environment. In contrast, when, the rolling contact fatigue life ratio was less than 2.0, the carbonitrided bearing was determined to be low in rolling contact fatigue life under a hydrogen-generating environment.

Test Results

Table 2 shows results of the tests. Referring to Table 2, in chemical compositions of Test Nos. 1 to 10, contents of elements were appropriate, and F1 to F4 satisfied Formula (1) to Formula (4). In addition, their production conditions were also appropriate. Therefore, the specified oxides proportion RA was 30.0% or more and the number density of oxides having an equivalent circle diameter of 20.0 μm or more was 15.0 pieces/mm$^2$ or less. Therefore, the steels each showed a service life ratio of 0.8 or more, and thus the steels each provided an excellent machinability. In addition, in their respective carburized bearings, a surface concentration of C was 0.70 to 1.20%, a Rockwell hardness C scale HRC of the surface was 58.0 to 65.0, and a martensite area fraction of the core portion was 90.0% or more. Moreover, in the rolling contact fatigue life, test under a hydrogen-generating environment, their rolling contact fatigue life ratios were 2.0 or more, and thus their rolling contact fatigue lives under a hydrogen-generating environment were excellent.

In contrast, in Test No. 11, although contents of elements in the chemical composition tell within the respective ranges according to the present embodiment and satisfied Formula (2) to Formula (4), the F1 value was less than the lower limit of Formula (1). As a result, its rolling contact fatigue life ratio was less than 2.0, and thus a rolling contact fatigue life under a hydrogen-generating environment was short.

In Test No. 12, although contents of elements in the chemical composition fell within the respective ranges according to the present embodiment and satisfied Formula (2) to Formula (4), the F2 value was more than the upper limit of Formula (1). As a result, its rolling contact fatigue life ratio was less than 2.0, and thus a rolling contact fatigue life under a hydrogen-generating environment was short.

In Test No. 13, although contents of elements in the chemical composition fell within the respective ranges according to the present embodiment and satisfied Formula (1), Formula (3) and Formula (4), the F2 value was less than the lower limit of Formula (2). As a result, its rolling contact fatigue life ratio was less than 2.0, and thus a rolling contact fatigue life under a hydrogen-generating environment was short.

In Test No. 14, although contents of elements in the chemical composition fell within the respective ranges according to the present embodiment and satisfied Formula (1), Formula (3), and Formula (4), the F2 value was more than the upper limit of Formula (2). As a result, a total area fraction of ferrite and pearlite in its microstructure was less than 50%, and a service life ratio of its steel was less than 0.8, and thus the steel was low in machinability.

In Test Nos. 15 and 16, although contents of elements in their chemical compositions fell within the respective ranges according to the present embodiment and satisfied Formula (1) Formula (2), and Formula (4), the F3 value was less than the lower limit of Formula (3). As a result, rolling contact fatigue life ratios were less than 2.0, and thus rolling contact fatigue lives under a hydrogen-generating environment were short.

In Test Nos. 17 and 18, although contents of elements in their chemical compositions fell within the respective ranges according to the present embodiment and satisfied Formula (1) to Formula (3), the F4 value was less than the lower limit of Formula (4). As a result, rolling contact fatigue life ratios were less than 2.0, and thus rolling contact fatigue lives under a hydrogen-generating environment were short.

In Test Nos. 19 and 20, contents of elements in the chemical composition of their steels were appropriate and satisfied Formula (1) to Formula (4). In addition, condition 2 to condition 4 of the production conditions were satisfied. However, the refining time in the LF of condition 1 was too short. Therefore, the specified oxides proportion RA was less than 30.0%. In addition, the number density of oxides having an equivalent circle diameter of 20.0 μm or more was more than 15.0 pieces/mm$^2$. As a result, rolling contact fatigue life ratios were less than 2.0, and thus rolling contact fatigue lives under a hydrogen-generating environment were short.

In Test Nos. 21 and 22, contents of elements in the chemical composition of their steels were appropriate and satisfied Formula (1) to Formula (4). In addition, condition 1 to condition 3 of the production conditions were satisfied. However, the refining time in the RH of condition 4 was too short. Therefore, the number density of oxides having an equivalent circle diameter of 20.0 μm or more was more than 15.0 pieces/mm$^2$. As a result, rolling contact fatigue life ratios were less than 2.0, and thus rolling contact fatigue lives under a hydrogen-generating environment were short.

In Test No. 23, contents of elements in the chemical composition of the steel were appropriate and satisfied Formula (1) to Formula (4). In addition, condition 1, condition 3 and condition 4 of the production conditions were satisfied. However, for condition 2, the basicity of the slag after completion of the refining in the LF was less than 5.0. Therefore, the specified oxides proportion RA was less than 30.0%. In addition, the number density of oxides having an equivalent circle diameter of 20.0 μm or more was more than 15.0 pieces/mm$^2$. As a result, its rolling contact fatigue life ratio was less than 2.0, and thus a rolling contact fatigue life under a hydrogen-generating environment was short.

In Test No. 24, contents of elements in the chemical composition of the steel were appropriate and satisfied Formula (1) to Formula (4). In addition, condition 1, condition 3 and condition 4 of the production conditions were satisfied. However, for condition 2, the basicity of the slag after completion of the refining in the LF was more than 12.0. Therefore, the number density of oxides having an equivalent circle diameter of 20.0 μm or more was more than 15.0 pieces/mm$^2$. As a result, its rolling contact fatigue life ratio was less than 2.0, and thus a rolling contact fatigue life under a hydrogen-generating environment was short.

In Test No. 25, contents of elements in the chemical composition of the steel were appropriate and satisfied Formula (1) to Formula (4). In addition, condition 1, condition 2 and condition 4 of the production conditions were satisfied. However, for condition 3, the content of Al in the molten steel idler the refining in the LF was more than 80.0% of the content of Al in the steel after production. Therefore, the specified oxides proportion RA was less than 30.0%. In addition, the number density of oxides having an equivalent circle diameter of 20.0 μm or more was more than 15.0 pieces/mm$^2$. As a result, its rolling contact fatigue life ratio was less than 2.0, and thus a rolling contact fatigue life under a hydrogen-generating environment was short.

An embodiment according to the present invention has been described above. However, the embodiment described above is merely an example of practicing the present invention. The present invention is it not limited to the embodiment described above, and the embodiment described above can be modified and practiced as appropriate without departing from the scope plate present invention.

The invention claimed is:

1. A carburized bearing comprising:

a carburized layer formed in an outer layer of the carburized bearing; and a core portion inner than the carburized layer, wherein the core portion comprises, in mass %:

C: 0.25 to 0.45%,

Si: 0.10 to 0.50%,

Mn: 0.40 to 0.70%,

P: 0.015% or less,

S: 0.005% or less,

Cr: 0.80 to 1.50%,

Mo: 0.17 to 0.30%,

V: 0.24 to 0.40%,

Al: 0.005 to 0.100%,

N: 0.0300% or less,

O: 0.0015% or less, and the balance being Fe and impurities, and on a precondition that a content of each element of the core portion falls within a range described above, Formula (1) to Formula (4) are satisfied, wherein a concentration of C of a surface of the carburized bearing is, in mass %, 0.70 to 1.20%, a Rockwell hardness C scale HRC of the surface of the carburized bearing is 58.0 to 65.0, the carburized bearing contains a plurality of CaO—CaS—MgO—$Al_2O_3$ composite oxides containing:

at least one selected from the group consisting of CaO and CaS,

MgO, and $Al_2O_3$, a proportion of a total area of the CaO—CaS—MgO—$Al_2O_3$ composite oxides with respect to a total area of oxides in the carburized bearing is 30.0% or more; and wherein the carburized bearing comprises oxides and among oxides in the carburized bearing, a number density of oxides having an equivalent circle diameter of 20.0 μm or more is 0.1 to no more than 15.0 pieces/mm$^2$:

$$1.50<0.4Cr+0.4Mo+4.5V<2.45 \quad (1)$$

$$2.20<2.7C+0.4Si+Mn+0.45Ni+0.8Cr+Mo+V<3.50 \quad (2)$$

$$Mo/V \geq 0.58 \quad (3)$$

$$(Mo+V+Cr)/(Mn+20P) \geq 2.00 \quad (4)$$

where each symbol of an element in Formula (1) to Formula (4) is to be substituted by a content of a corresponding element in mass %, and is to be substituted by "0" if the corresponding element is not contained.

2. The carburized bearing according to claim 1, wherein the core portion further contains, in lieu of a part of Fe, one or more elements selected from the group consisting of:

Cu: 0.20% or less,

Ni: 0.20% or less,

B: 0.0050% or less,

Nb: 0.100% or less, and

Ti: 0.100% or less.

* * * * *